United States Patent
Burhanuddin et al.

(10) Patent No.: US 12,056,150 B2
(45) Date of Patent: Aug. 6, 2024

(54) GENERATING VISUAL STORIES FROM DATA SETS

(71) Applicant: Adobe Inc., San Jose, CA (US)

(72) Inventors: Iftikhar Ahamath Burhanuddin, Bangalore (IN); Koyel Mukherjee, Bangalore (IN); Vibhor Porwal, Auraiya (IN); Rebin Silva V, Chennai (IN); Jonathan Ve Vance, Ernakulam (IN); Gadikoyila Satya Vamsi, Gollaprolu (IN); Meenakshi Chembil Shaji, Ernakulam (IN)

(73) Assignee: Adobe Inc., San Jose, CA (US)

( * ) Notice: Subject to any disclaimer, the term of this patent is extended or adjusted under 35 U.S.C. 154(b) by 2 days.

(21) Appl. No.: 17/649,736

(22) Filed: Feb. 2, 2022

(65) Prior Publication Data
US 2023/0244690 A1 Aug. 3, 2023

(51) Int. Cl.
*G06F 16/26* (2019.01)
*G06F 16/2457* (2019.01)
*G06F 16/2458* (2019.01)

(52) U.S. Cl.
CPC ........ *G06F 16/26* (2019.01); *G06F 16/24578* (2019.01); *G06F 16/2458* (2019.01)

(58) Field of Classification Search
CPC .............................. G06F 16/26; G06F 16/2458
See application file for complete search history.

(56) References Cited

U.S. PATENT DOCUMENTS

| | | | |
|---|---|---|---|
| 2007/0185864 A1* | 8/2007 | Budzik | G06F 16/248 707/999.005 |
| 2012/0041715 A1* | 2/2012 | Hathaway | G06F 17/18 702/179 |
| 2013/0097531 A1* | 4/2013 | Rose | G06F 3/048 715/753 |
| 2020/0210647 A1* | 7/2020 | Panuganty | G06N 20/10 |
| 2020/0251111 A1* | 8/2020 | Temkin | G10L 15/22 |
| 2021/0350068 A1* | 11/2021 | Sanossian | G06F 16/258 |
| 2022/0237228 A1* | 7/2022 | Xu | G06F 16/90332 |

OTHER PUBLICATIONS

Gartner Report, Top Trends in Data and Analytics for 2021: The Rise of the Augmented Consumer; published Feb. 16, 2021.
Shi, Danqing et al.; Calliope: Automatic Visual Data Story Generation from a Spreadsheet—IEEE TVCG 2021.
(Continued)

*Primary Examiner* — Kimberly L Wilson
(74) *Attorney, Agent, or Firm* — Keller Preece PLLC

(57) ABSTRACT

Methods, systems, and non-transitory computer readable media are disclosed for intelligently generating comprehensive and relevant visual data stories from tabular data. The disclosed system can create data stories from a given dataset guided by some user selections to set a theme for the story. In particular, the disclosed system evaluates facts of a dataset to identify significant facts. The disclosed system can order significant facts to create a backbone for the data story based on user selections by utilizing a beam search. Furthermore, the disclosed system can expand the backbone of the data story by generating coherence facts. The disclosed system may present the generated story via a graphical user interface.

20 Claims, 13 Drawing Sheets

(56) References Cited

OTHER PUBLICATIONS

Tang, Bo et al.; Extracting Top-K Insights from Multi-dimensional Data—SIGMOD 2017.
Ding, Rui et al.; QuickInsights: Quick and Automatic Discovery of Insights from Multi-Dimensional Data—SIGMOD 2019.
Lu, Junhua et al.; Automatic Generation of Unit Visualization-based Scrollytelling for Impromptu Data Facts Delivery—IEEE PacificVis 2021.
Ma, Pingchuan; MetaInsight: Automatic Discovery of Structured Knowledge for Exploratory Data Analysis—SIGMOD 2021.
Leppanen, Leo; A Baseline Document Planning Method for Automated Journalism—Proceedings of the 23rd Nordic Conference on Computational Linguistics (NoDaLiDa) 2021.
Wikipedia, the free encyclopedia; "Shapiro-Wilk Test"; Feb. 10, 2022; https://en.wikipedia.org/wiki/Shapiro-Wilk_test.
Wikipedia, the free encyclopedia; "Wald test"; Feb. 10, 2022; https://en.wikipedia.org/wiki/Wald_test.
Wikipedia, the free encyclopedia; "Grubbs's test"; Feb. 10, 2022; https://en.wikipedia.org/wiki/Grubbs's_test.
Wikipedia, the free encyclopedia; "Chi-squared test"; Feb. 10, 2022; https://en.wikipedia.org/wiki/Chi-squared_test.

\* cited by examiner

GENERATING VISUAL STORIES FROM DATA SETS

BACKGROUND

Recent years have seen a significant increase in hardware and software platforms for generating and providing data narratives. For examples, developers have created data narrative systems that generate visualizations that illustrate key metrics in data. More particularly, conventional data narrative systems can generate graphs, charts, or other visualizations to reflect trends in data. Moreover, conventional data narrative systems allow users to compile a series of data visualizations to create a coherent story.

SUMMARY

One or more embodiments provide benefits and/or solve one or more problems in the art with systems, methods, and non-transitory computer readable storage media that create data stories from tabular data utilizing a beam search algorithm. Generally, the disclosed system comprises a graph-based approach to generate data stories from a given dataset guided by some user selections to set a theme for the story. Specifically, the user selects variables of interest to be portrayed by the data story. The disclosed system utilizes the selected variables to generate a data story with a global perspective provided by backbone facts connected by sub-stories determined utilizing a beam search algorithm. The generated data story highlights key insights found in the selected (and additional) variables and presents them to the user in a coherent sequence formed by visualizations and captions.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

DETAILED DESCRIPTION

Figure 1:
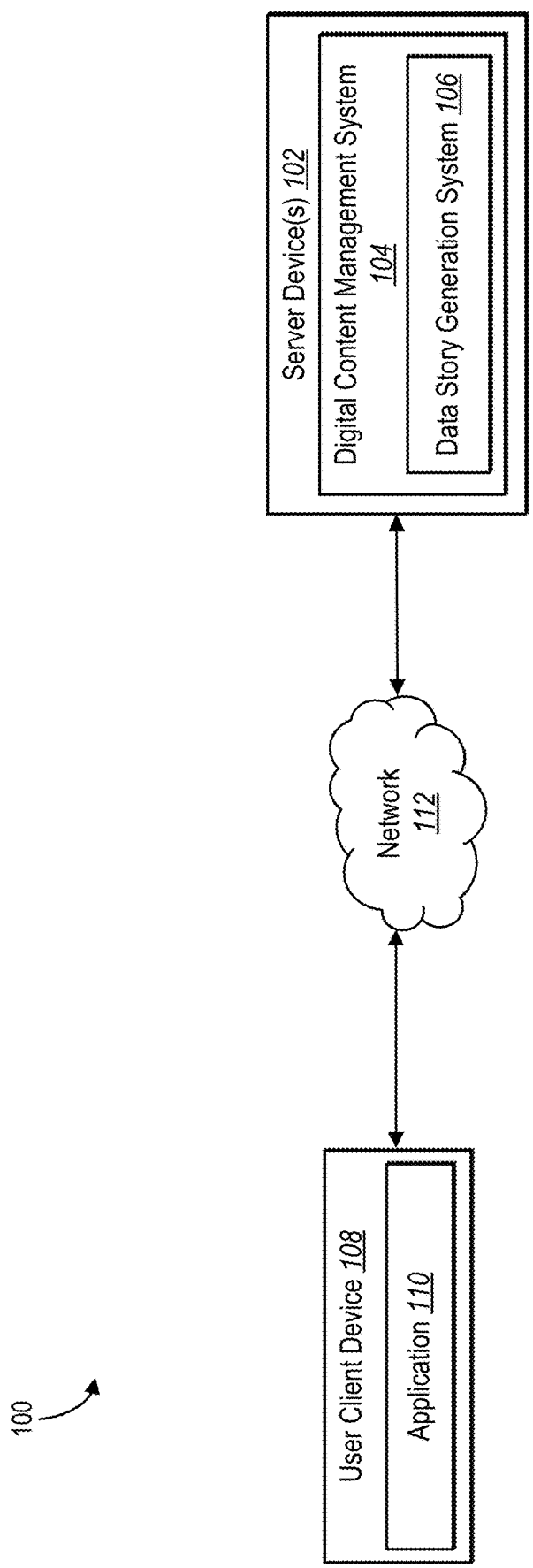
FIG. 1 illustrates an environment in which a data story generation system operates in accordance with one or more embodiments of the present disclosure.

One or more embodiments of the present disclosure includes a data story generation system that automatically generates a visual data story based on a tabular dataset and user selections utilizing a beam search algorithm to provide global perspective and coherence. Generally, the data story generation system extracts significant facts from a dataset. The data story generation system further generates backbone facts that give the final data story a global perspective. In particular, the data story generation system performs a beam search on the significant facts. The data story generation system further generates data stories with a sub-story structure by generating and selecting facts related to the backbone facts utilizing a beam search. The data story generation system further presents a generated data story to a user comprising the backbone facts and the sub-story facts related to the backbone facts.

To illustrate, in some embodiments, the data story generation system generates importance scores for facts in a dataset. The data story generation system extracts important facts from the database based on the importance scores. In some embodiments, the data story generation system generates, based on a user query, a sequence of facts from the important facts, wherein the sequence of facts dictate a flow of a visual data story. The data story generation system further generates coherence facts to connect facts in the sequence of fact. The data story generation system also provides, for display via a data story graphical user interface, the visual data story comprising the sequence of facts and the coherence facts.

As just mentioned, in some embodiments, the data story generation system generates importance scores for facts within a dataset. Generally, the data story generation system generates importance scores to identify important or statistically significant facts within the dataset. In particular, the data story generation system generates the importance scores based on significance scores and self-information scores. In some embodiments, a significance score indicates how interesting a fact is and the self-information score reflects a probability of the occurrence of the fact.

The data story generation system further extracts important facts from the dataset based on the importance scores. For instance, in some embodiments, the data story generation system ranks the facts based on importance score and identifies important facts based on importance scores. In one example, the data story generation system extracts important facts based solely on the importance scores. In another example, the data story generation system extracts important and coherence facts based on both the importance scores and a user query.

The data story generation system further generates a sequence of facts from the important facts. The sequence of facts dictates a backbone for a visual data story conditioned on a user query. To ensure that the sequence of facts is relevant to a user query, the data story generation system performs a beam search of the important facts utilizing the user query as a starting fact. In particular, the data story generation system generates candidate sequences of facts and candidate scores and select a sequence of facts based on the candidate scores. The candidate scores reflect parameters including one or more of diversity, coherence, integrity, and/or relevance.

While the sequence of facts, in one or more embodiments, have high coverage of data within the dataset, the sequence of facts may have less coherence. The data story generation system, in one or more embodiments, expands the sequence of facts by generating coherence facts connecting consecutive facts within the sequence of facts to improve the coherence of the final data story. In some embodiments, the data story generation system identifies two consecutive facts in the sequence of facts-a fact and a neighboring fact. Starting from the fact, the data story generation system generates new related facts and performs a beam search on the new related facts. In each branch, the data story generation system generates new sets of facts from the last fact and performs a beam search on the new sets of facts. In one or more embodiments, the data story generation system stops or ceases expansion based on a new fact being similar (e.g., with in a threshold) or equal to the neighboring fact.

In some embodiments, the data story generation system guides data story generation utilizing user queries. In one example, a user query comprises target values. In some embodiments, a user query also includes target weights for parameters. More particularly, the data story generation system utilizes target values to identify key values to emphasize in generating a sequence of facts. The data story generation system, in one or more embodiments, also creates a starting fact using the target values. In some embodiments, the data story generation system utilizes target weights for parameters to guide generation of coherence facts that connect backbone facts in a sequence of facts.

The data story generation system presents the data story to the user via a graphical user interface. For example, the data story generation system presents the sequence of facts and the connecting coherence facts via a data story graphical user interface. In particular, the data story generation system generates one or more charts and graphs illustrating the sequence of facts and the connecting coherence facts and provides them via the graphical user interface.

The data story generation system provides several technical benefits relative to conventional systems. Specifically, conventional data analytics systems are often constrained to creating data stories having narrow perspectives. Conventional systems often compile data stories made of pre-selected or randomly selected facts. Stories generated by these conventional systems are often highly conditional on a first pre-selected fact. More specifically, these conventional systems frequently only explore facts that are at most story-length "edits" away from the pre-selected fact. Accordingly, conventional systems frequently generate data stories that are narrowly focused on pre-selected facts.

Conventional systems often fail to accurately generate coherent data stories. For example, conventional systems may rely on users to select facts to include within a data story. User-selected facts are often irrelevant to each other. However, even if the user-selected facts are relevant, conventional systems often fail to organize them in a coherent manner. Some conventional systems randomly select facts within a dataset or present insights about the dataset. These conventional systems often fail to weave a coherent story from a dataset.

Furthermore, conventional data analytics systems are often inefficient. To create a coherent and comprehensive data story, conventional systems often require an analyst to analyze data, find insights, and create a presentation. This requires users to click through multiple dashboards and data to identify relevant visualizations to include within a data story. Furthermore, conventional data analytics systems often require users to make extra selections to order visualizations in a coherent manner.

The data story generation system cover datasets more comprehensively in a global manner compared to conventional systems. Specifically, the data story generation system extracts important facts from an entire dataset. Furthermore, the data story generation system generates importance scores for each fact within a dataset to identify important facts from the entire dataset. In contrast with conventional systems that build stories highly related to a few pre-selected facts, the data story generation system generates, utilizing a beam search algorithm, a sequence of facts from the comprehensive important facts to give the data story a global perspective. Thus, the data story generation system is able to uncover phenomena in data that a user had not anticipated.

The data story generation system is also able to more accurately identify and order coherence facts to weave a coherent data story relative to conventional systems. By performing a beam search on important facts beginning with a user query, the data story generation system generates a coherent sequence of facts. Furthermore, the data story generation system generates data stories with a sub-story structure by selecting coherence facts to connect facts within the sequence of facts utilizing a beam search. To illustrate, when expanding upon a sequence of facts in one or more embodiments, the data story generation system iterates over possible coherence relations to generate a new set of facts related to a fact in the sequence of facts. The data story generation system further performs a beam search on the new set of fact to extract sub-stories.

Furthermore, the data story generation system is more efficient relative to conventional systems. While conventional systems often require users to perform several steps to create a data story, the data story generation system provides a single intuitive data story graphical user interface that collects user queries. In some embodiments, the data story generation system collects indications of target values and, optionally, target weights for parameters via a single data story graphical user interface. In contrast with conventional data analytics systems, the data story generation system automatically generates coherent and relevant data stories based on limited user input.

As illustrated by the foregoing discussion, the present disclosure utilizes a variety of terms to describe features and advantages of the disclosed method. Additional detail is now provided regarding the meaning of such terms. As used herein, the term "dataset" refers to a collection of sets of information. In one or more embodiments, a dataset comprises data organized in a tabular format. For example, a dataset refers to a set of tabular data comprising one or more tables, where every column of a table represents a particular variable, and each row corresponds to a given record of the data in question. For example, in one or more embodiments, a dataset comprises a table comprising several facts.

As used herein, the term "fact" refers to information found within a dataset. In particular, a fact comprises object values that may be conveyed using a data visualization. For example, a fact comprises a tuple of a type, a subspace, a measure, a breakdown, and an aggregate. In this example, type, subspace, etc. comprise objects that associated with values. To illustrate, the fact "Total profit on Company X cars is increasing over years" is represented as the tuple of type=TREND, subspace=Company X, measure=Profit, breakdown=Year and aggregate=Total.

Relatedly, as used herein, the term "important fact" refers to facts from a dataset that are important. In particular, an important fact refers to significant facts from the dataset that are able to help tell a story in a final visual data story. For example, an important fact is a fact with a corresponding importance score above a threshold importance value. As used herein, the term "importance score" refers to a value reflecting the importance of a fact. In particular, an importance score comprises a combination of a statistical significance and a probability of occurrence of a fact.

As used herein, the term "sequence of facts" refers to an ordered series of facts. In particular, a sequence of facts comprises a series of important facts that provide a backbone for a visual data story. Generally, the sequence of facts dictates a flow of the visual data story. For example, the sequence of facts comprises a starting fact followed by other important facts that shape the progression and focus of a visual data story.

As used herein, the term "visual data story" (or simply "data story") refers to a visual representation of a series of meaningfully connected story pieces. In particular, a visual data story includes an arrangement of data visualizations and/or captions that communicates significant information about a data set. For example, in one or more embodiments, a visual data story comprises an ordered series of data visualizations (e.g., tables, graphs, charts) corresponding to facts within a dataset.

As used herein, the term "coherence facts" refers to facts that connect consecutive facts within a sequence of facts. In particular, coherence facts make up sub-stories between consecutive facts within a sequence of facts. For example, coherence facts include one or more facts connecting a fact and a neighboring fact within a sequence of facts.

The following disclosure provides additional detail regarding the data story generation system in relation to illustrative figures portraying example embodiments and implementations of the data story generation system. For example, FIG. 1 illustrates a schematic diagram of a system environment (or "environment") 100 in which a data story generation system 106 operates in accordance with one or more embodiments. As illustrated, the environment 100 includes one or more server device(s) 102, connected to a user client device 108 via a network 112. While FIG. 1 shows an embodiment of the data story generation system 106, alternative embodiments and configurations are possible.

As shown in FIG. 1, the server device(s) 102 and the user client device 108 are connected via the network 112. As shown, in one or more implementations, each of the components of the environment 100 communicate via the network 112. The network 112 comprises a suitable network over which computing devices are able to communicate. Example networks are discussed in additional detail below in relation to FIG. 10.

As shown, the environment 100 includes the server device(s) 102. The server device(s) 102 generates, stores, receives, and/or transmits digital information including datasets, facts, data visualizations, metadata, etc. In particular, in one or more implementations, the server device(s) 102 provides digital information via web pages or native application to devices such as the user client device 108. The server device(s) 102 is able to communicate with the user client device 108 via the network 112. For example, the server device(s) 102 gathers and/or receives digital information including datasets, data visualizations, and/or user queries from the user client device 108. The server device(s) 102 may also present visual data stories at the user client device 108. In some embodiments, the server device(s) 102 comprise a distributed server where the server device(s) 102 include a number of server devices distributed across the network 112 and located in different physical locations. The server device(s) 102 optionally comprises a content server, an application server, a communication server, a web-hosting server, or a digital content management server.

As further shown in FIG. 1, the server device(s) 102 includes a digital content management system 104. In one or more embodiments, the digital content management system 104 comprises a data story generation system 106 that communicates digital information over the network 112. The digital content management system 104 also performs various backend functions associated with the generation of visual data stories. As illustrated in FIG. 1, the data story generation system 106 is implemented as part of the digital content management system 104. Generally, the data story generation system 106 intelligently and automatically generates visual data stories based on a dataset and user query.

As illustrated in FIG. 1, the environment 100 includes the user client device 108. The user client device 108 may generate, store, receive, and send digital data. For example, the user client device 108 communicates with the server device(s) 102 via the network 112. The user client device 108 illustrated in FIG. 1 may comprise various types of client devices. For example, in some embodiments, the user client device 108 is a mobile device such as a laptop, tablet, mobile telephone, smartphone, etc. In other embodiments, the user client device 108 includes non-mobile devices, such as desktops or servers, or other types of client devices. Additional details regarding the computing devices, of which the user client device 108 is one implementation, are discussed below with respect to FIG. 10.

The user client device 108 is optionally associated with a user or user account of a data narrative platform managed by the digital content management system 104. For instance, the user client device 108 is associated with a creator of a visual data story. Additionally, the user client device 108 is optionally associated with a user who is viewing a visual data story generated by the digital content management system 104. As mentioned, the user client device 108 communicates with the server device(s) 102. In particular, the user client device 108 uploads and sends digital data including user queries and datasets to the server device(s) 102 via the network 112. Additionally, the user client device 108 displays graphical user interfaces including visual data stories to a user associated with the user client device 108.

As illustrated in FIG. 1, the user client device 108 includes the application 110. The application 110 may be a web application or a native application on the user client device 108 (e.g., a mobile application, a desktop application, etc.). The application 110 interfaces with the data story generation system 106 to provide digital content including visual data stories, datasets, and facts to the device(s) 102. In one or more implementations, the application 110 is a browser that renders a graphical user interface on the display of the user client device 108. For example, the application 110 renders graphical user interfaces for receiving user queries and datasets. Additionally, the application 110 optionally presents visual data stories for display via the user client device 108.

Although FIG. 1 depicts the data story generation system 106 located on the server device(s) 102, in some embodiments, the data story generation system 106 is implemented by (e.g., located entirely or in part) on one or more other components of the environment 100. For example, the data story generation system 106 may be implemented entirely (or in part) on the user client device 108.

Although the environment 100 includes a single user client device 108, in one or more embodiments, the environment 100 includes multiple user client devices and client devices. For example, the environment 100 include a first user client device 108 associated with a user who creates (and views) a visual data story. The environment 100 also optionally includes a second user client device 108 associated with a user who views the visual data story.

Additionally, the user client device 108 optionally communicates directly with the data story generation system 106, bypassing the network 112. Moreover, the data story generation system 106 may access one or more databases housed on the server device(s) 102 or elsewhere in the environment 100. Further, the data story generation system 106 optionally includes one or more machine learning models (e.g., neural networks), and the data story generation system 106 is implemented in a variety of different ways across the server device(s) 102, the network 112, and the user client device 108.

In particular, in some implementations, the data story generation system 106 on the server device(s) 102 supports the application on the user client device 108. For instance, the data story generation system 106 on the server device(s) 102 generates or trains the data story generation system 106 and provides the trained data story generation system 106 to the user client device 108. In other words, the user client device 108 obtains (e.g., downloads) the data story generation system 106 from the server device(s) 102. At this point, the user client device 108 may utilize the data story generation system 106 to generate visual data stories independently from the server device(s) 102.

In alternative embodiments, the data story generation system 106 includes a web hosting application that allows the user client device 108 to interact with content and services hosted on the server device(s) 102. To illustrate, in one or more implementations, the user client device 108 accesses a web page supported by the server device(s) 102. The user client device 108 provides input to the server device(s) 102 to generate visual data stories, and, in response, the data story generation system 106 on the server device(s) 102 performs operations. The server device(s) 102 then provides the output or results of the operations to the user client device 108.

Figure 2A:
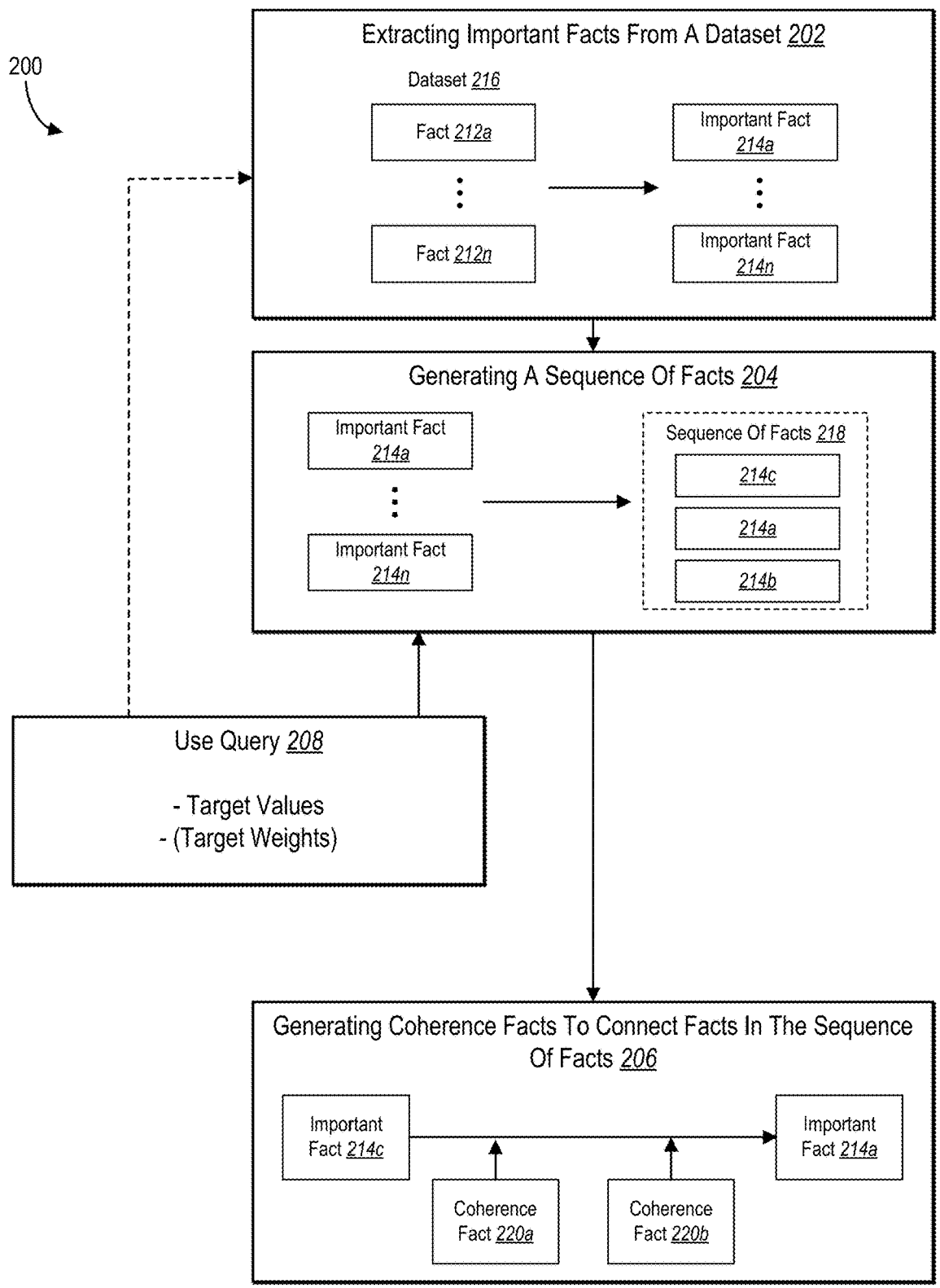
FIGS. 2A-2B illustrate an overview diagram of generating a visual data story in accordance with one or more embodiments of the present disclosure.
Figure 2B:
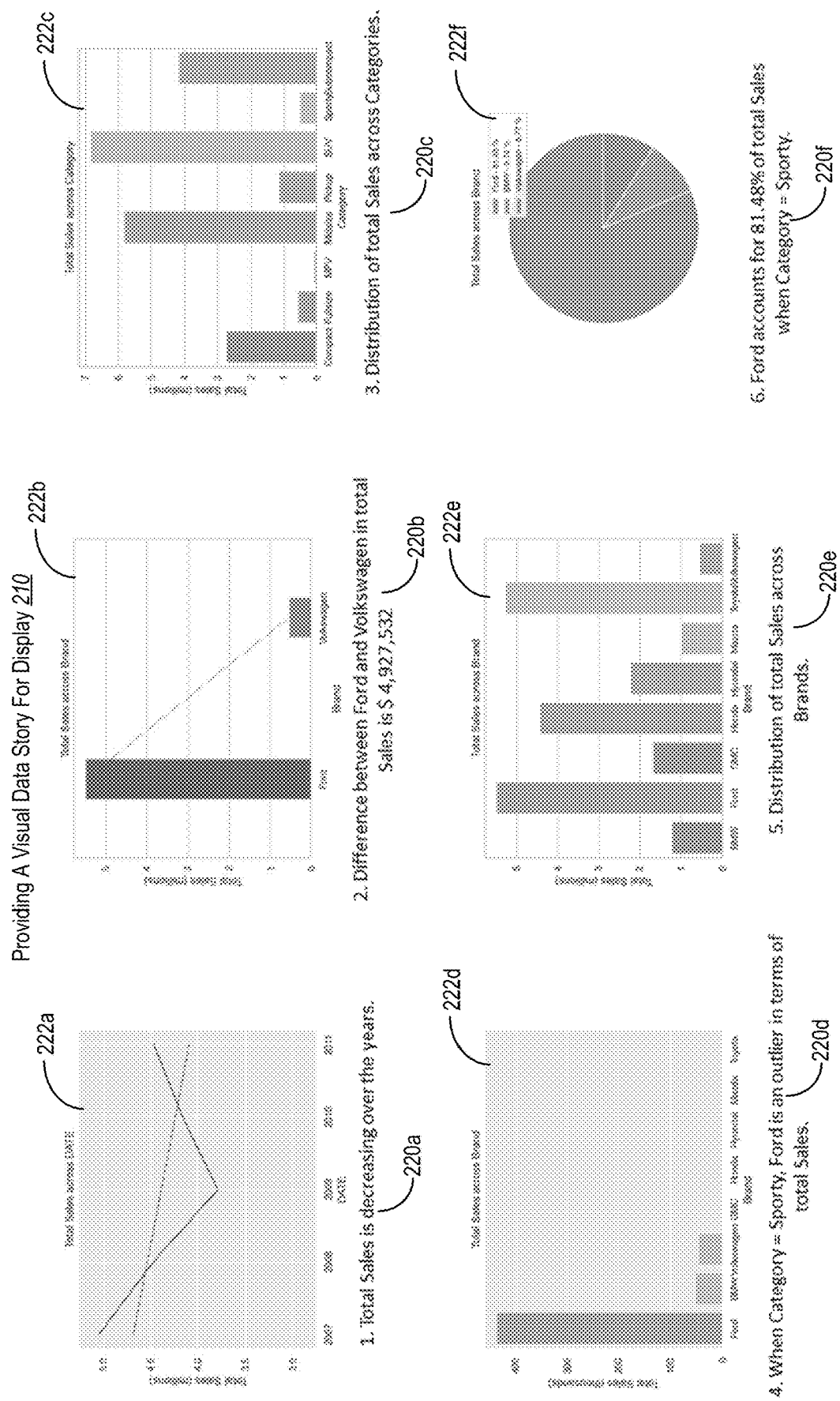

While FIG. 1 illustrates an example environment in which the data story generation system 106 operates, the following figures and corresponding discussion provide additional detail regarding how the data story generation system 106 generates visual data stories in accordance with one or more embodiments. For example, FIGS. 2A-2B illustrate an overview of how the data story generation system 106 generates a visual data story in accordance with one or more embodiments. In particular, FIGS. 2A-2B illustrate a series of acts 200 including an act 202 of extracting important facts from a dataset, an act 204 of generating a sequence of facts, an act 206 of generating coherence facts to connect facts in the sequence of facts, and an act 210 of providing a visual data story for display.

Figure 3:
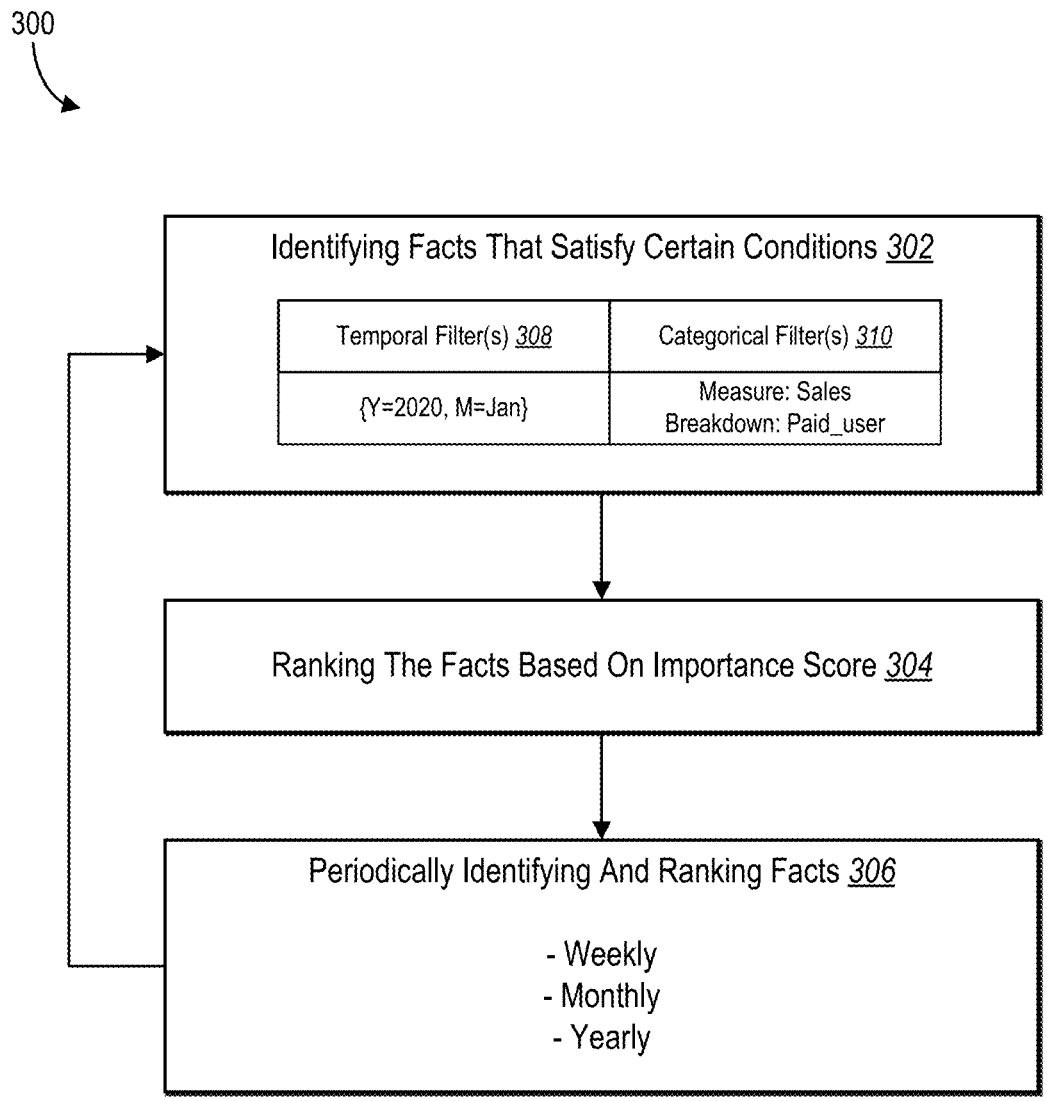
FIGS. 3-4 illustrate example methods for extracting important facts in accordance with one or more embodiments of the present disclosure.
Figure 4:
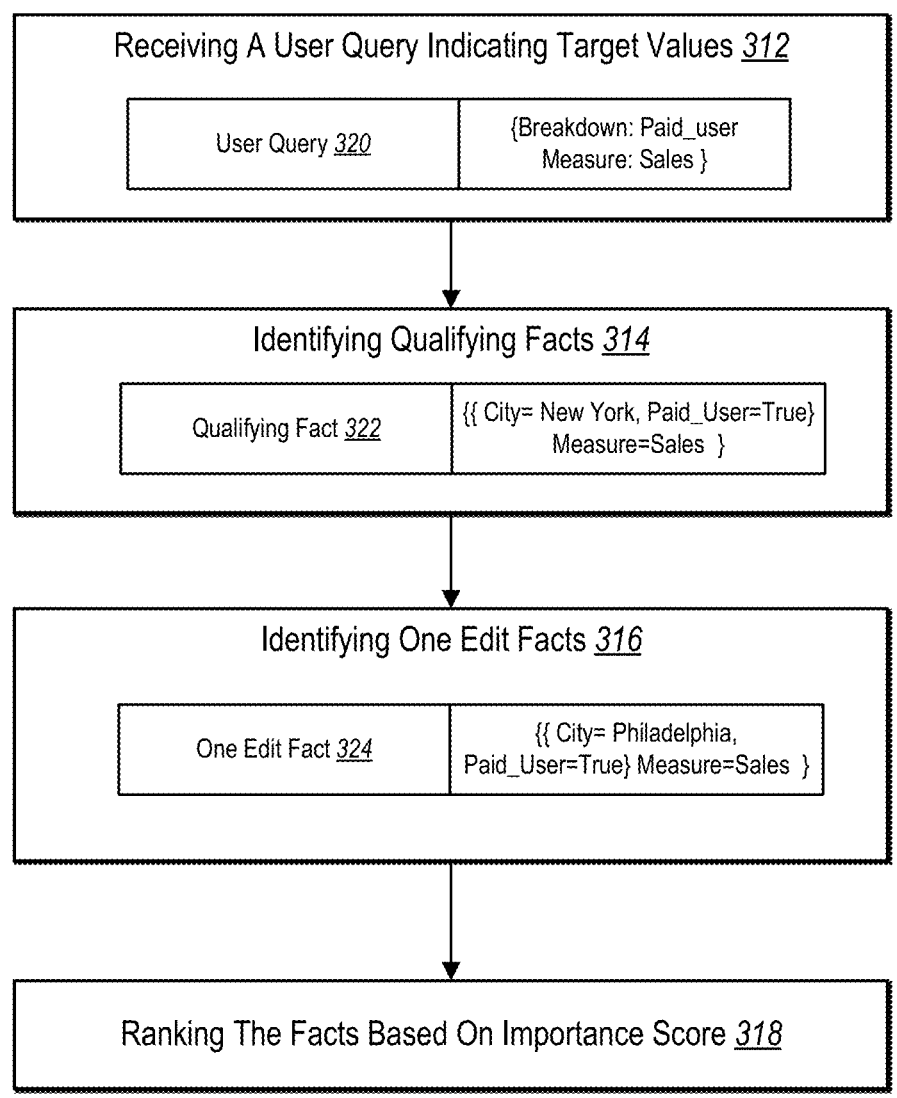

As mentioned, the data story generation system 106 performs the act 202 of extracting important facts from a dataset. As illustrated in FIG. 2A, the data story generation system 106 analyzes facts 212a-212n of dataset 216 to extract important facts 214a-214n. In some embodiments, the data story generation system 106 extracts the important facts 214a-214n by generating importance scores and ranking the facts 212a-212n based on their corresponding importance scores. Additionally, in some embodiments, the data story generation system 106 extracts the important facts 214a-214n based on both importance scores and a user query 208. For example, the data story generation system 106 can use the user query to extract important facts that are also relevant to target values. FIGS. 3-4 further detail how the data story generation system 106 extracts important facts in accordance with one or more embodiments.

Figure 5:
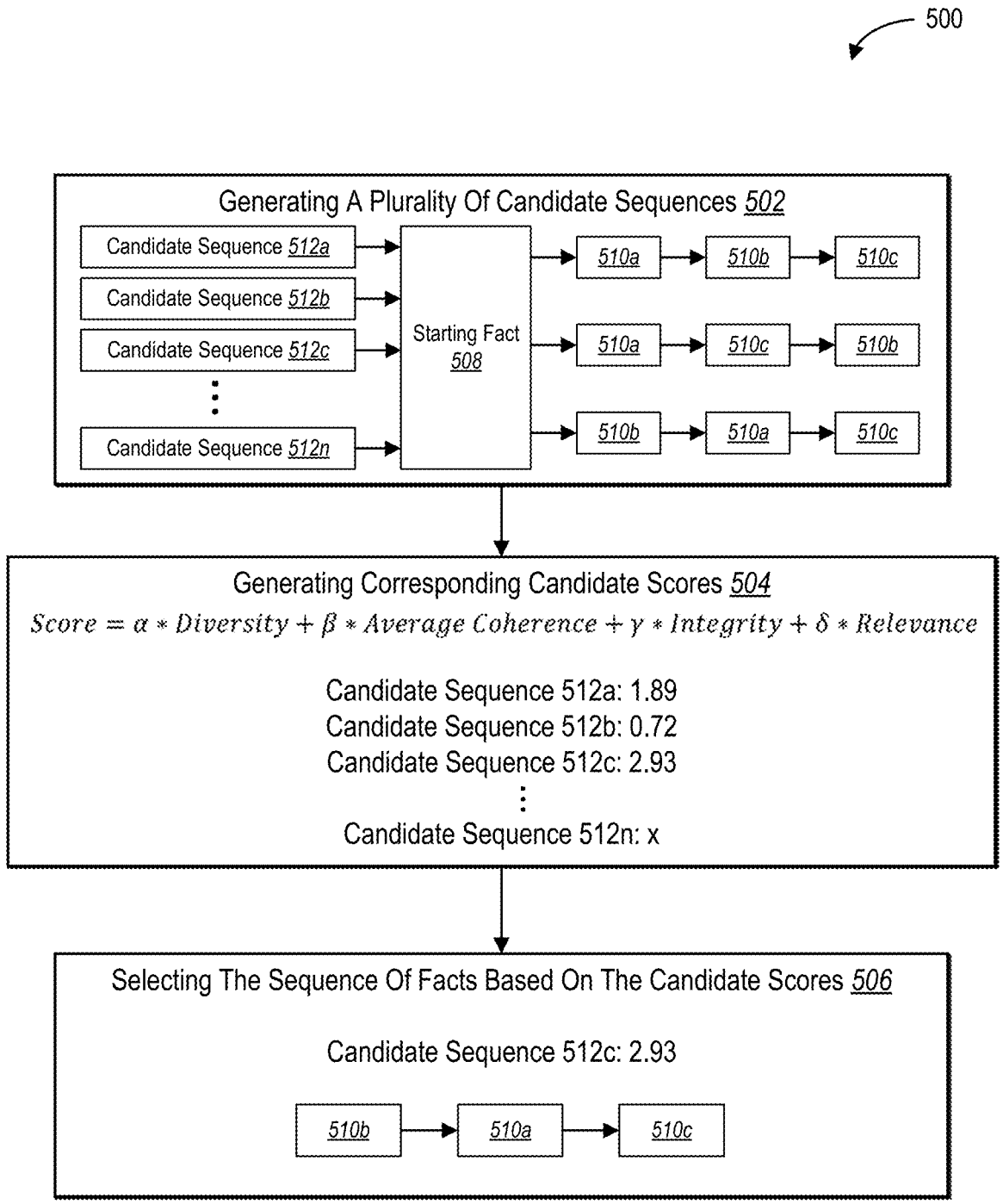
FIG. 5 illustrates an overview of selecting a sequence of facts in accordance with one or more embodiments of the present disclosure.

The data story generation system 106 further performs the act 204 of generating a sequence of facts. In particular, the data story generation system 106 selects and orders a subset of the important facts 214a-214n to form a sequence of facts 218. In some embodiments, the data story generation system 106 generates the sequence of facts 218 by performing a beam search of the important facts 214a-214n based on the user query 208. More specifically, the user query 208 includes target values and, optionally, target weights to guide the generation of the visual data story. As illustrated in FIG. 2A, the sequence of facts 218 includes the important fact 214c, the important fact 214a, and the important fact 214b. FIG. 5 and the corresponding discussion further detail how the data story generation system 106 generates a sequence of facts in accordance with one or more embodiments.

Figure 7A:
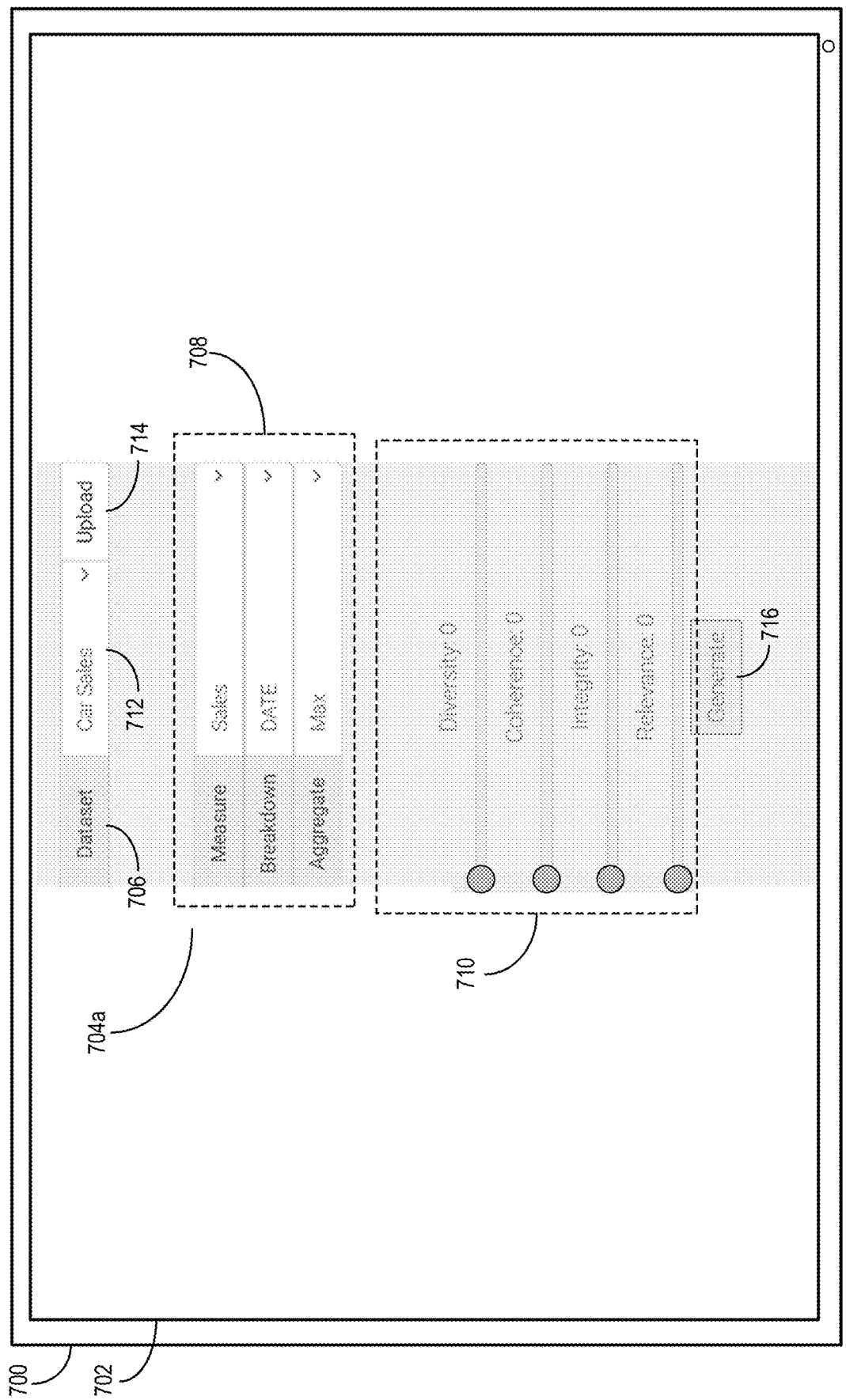
FIGS. 7A-7C illustrate a series of example data story graphical user interfaces in accordance with one or more embodiments of the present disclosure.
Figure 7B:
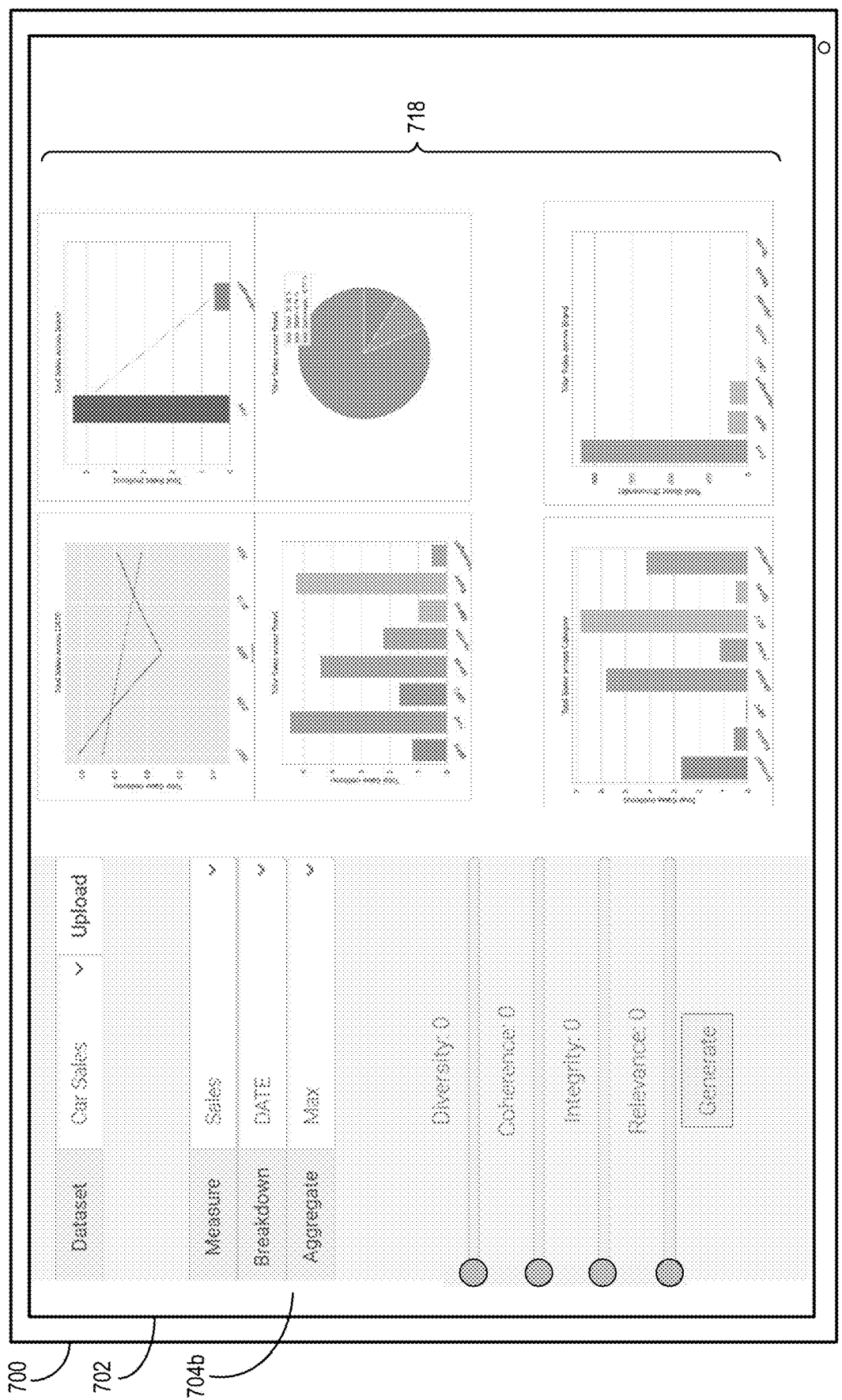
Figure 7C:
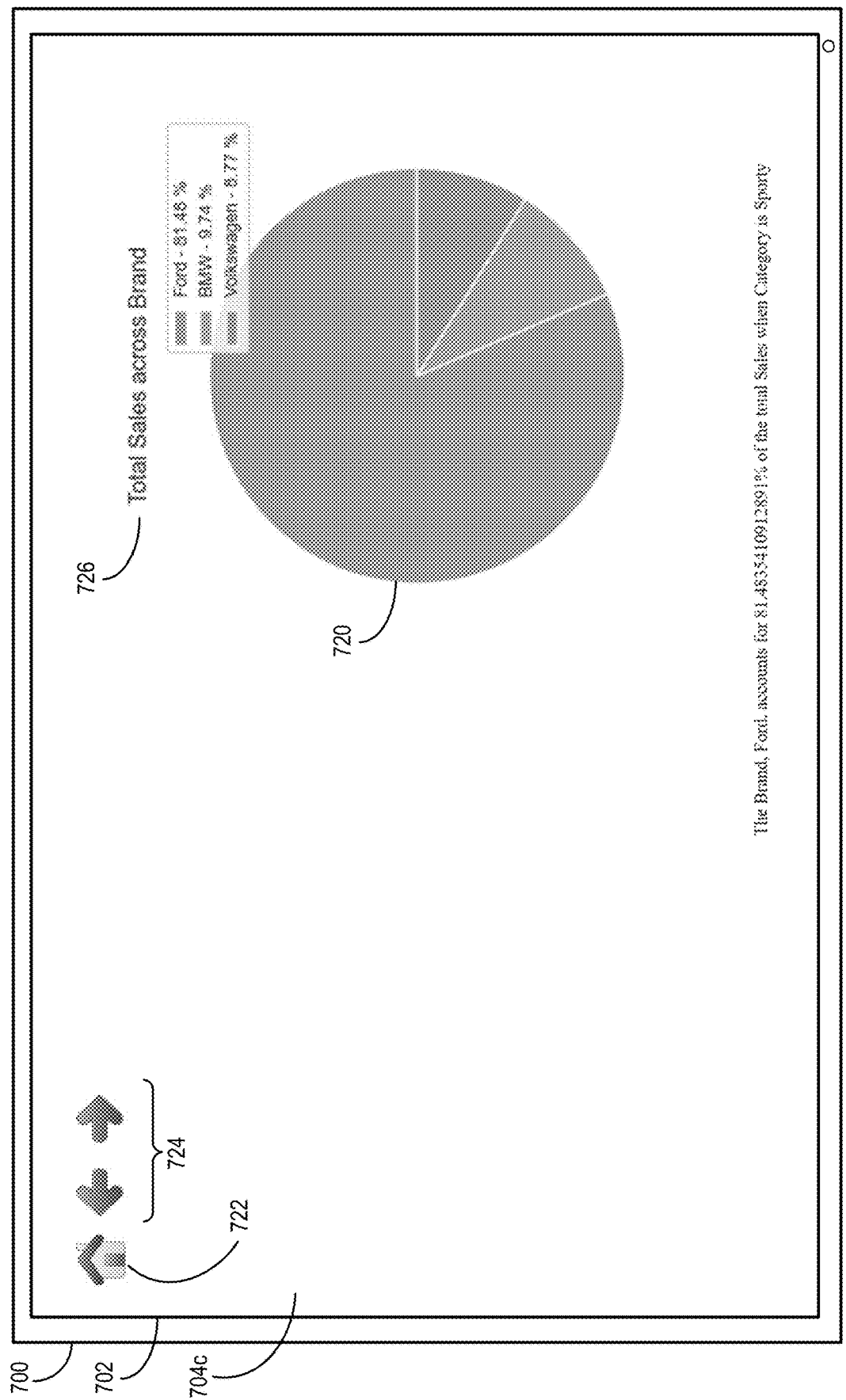

As illustrated in FIG. 2A, the data story generation system 106 receives the user query 208. The user query 208 includes target values and (optionally) target weights. FIGS. 7A-7C illustrate example data story graphical user interfaces for receiving the user query 208 in accordance with one or more embodiments.

Figure 6:
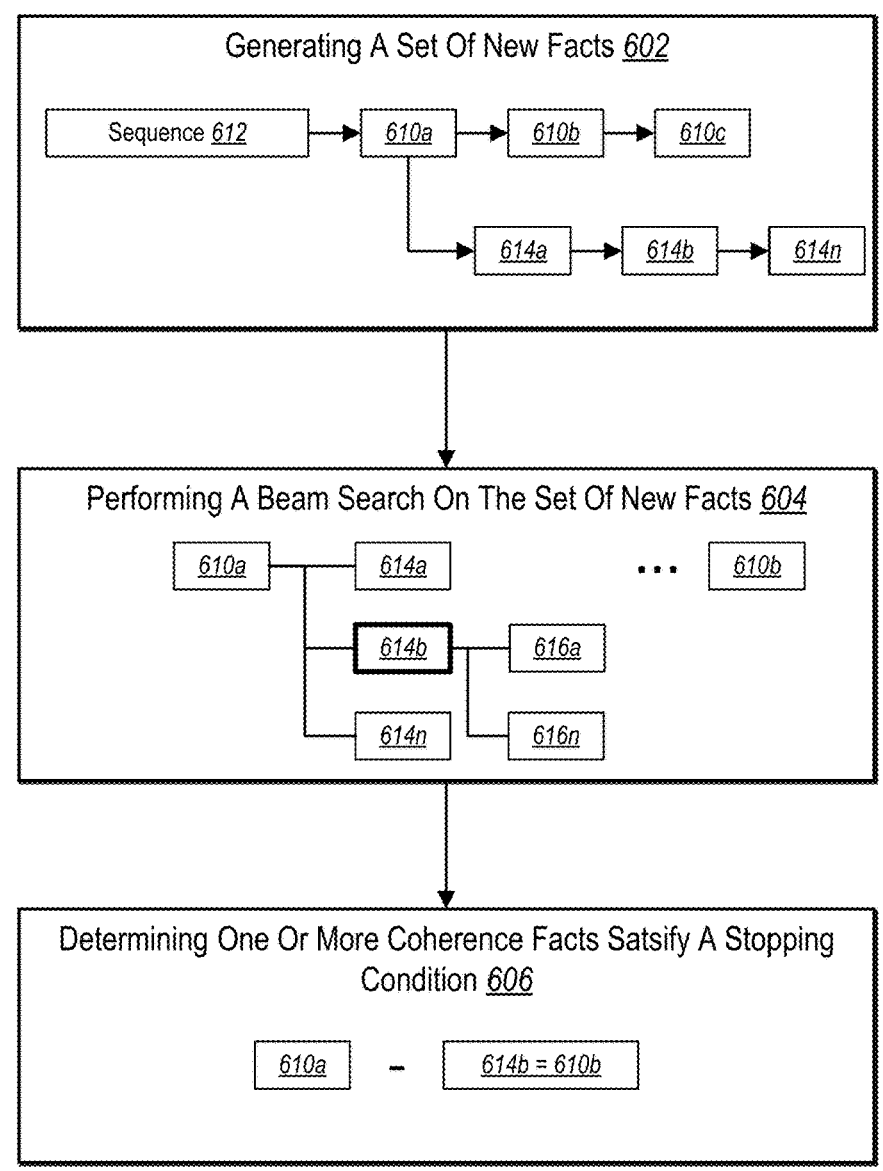
FIG. 6 illustrates an overview of generating coherence facts in accordance with one or more embodiments of the present disclosure.

The series of acts 200 illustrated in FIG. 2A further includes the act 206 of generating coherence facts to connect facts in the sequence of facts. Generally, the data story generation system 106 improves the coherence of a final data story by creating sub-stories made of relevant between consecutive important facts within the sequence of facts 218. In particular, the important fact 214c is used as a source fact and the important fact 214a is used as a neighboring fact. The data story generation system 106 generates one or more sets of new facts and performs beam search(es) on the sets of new facts to generate coherence facts 220a-220b that connect the important fact 214c to the important fact 214a. FIG. 6 and the corresponding paragraphs provide additional detail regarding the generation of coherence facts in accordance with one or more embodiments.

FIG. 2B illustrates the data story generation system 106 performing the act 210 of providing a visual data story for display. In particular, the data story generation system 106 provides, for display via a data story graphical user interface, the visual data story comprising the sequence of facts 218 and the coherence facts 220-220b. As illustrated in FIG. 2B, the data story generation system 106 presents a visual data story comprising data visualizations 222a-222f together with captions 224a-224f Each of the data visualizations 222a-222f and the captions 224a-224f correspond to an important fact and/or a relevant fact in the visual data story. In one or more embodiments, to generate a visual data story, the data story generation system 106 coverts a data fact into a captioned chart that includes both visual and textual representations of the data fact. Specifically, the data story generation system 106 is able to translate a fact and supporting data into one or more charts or graphs. For example, the data story generation system 106 selects a template chart or graph based on the data fact. The data story generation system 106 then completes the template chart or graph with data from the fact. As shown by the example visual data story of FIG. 2B, the visual data story stays relevant to a user selected subspace, explores different pieces of information across different measures, and includes a sequence that follows the measures changing in a smooth and coherent manner without any jumps.

As mentioned, the data story generation system 106 extracts important facts from a dataset. FIGS. 3-4 illustrate two methods by which the data story generation system 106 extracts important facts from a dataset in accordance with one or more embodiments. Generally, the data story generation system 106 explores an entire dataset and identifies facts that are important and significant for inclusion in a data story. In particular, FIG. 3 illustrates the data story generation system 106 extracting important facts based on the generation of importance scores, and FIG. 4 illustrates the data story generation system 106 extracting important facts relevant to user query based on importance scores and a user query in accordance with one or more embodiments.

FIG. 3 illustrates one method by which the data story generation system 106 extract important facts without utilization of a user query. Through this method, the data story generation system 106 runs a brute force search over all facts within a dataset that satisfy certain conditions. In particular, FIG. 3 illustrates a series of acts 300 including an act 302 of identifying facts that satisfy certain conditions, an act 304 of ranking the facts based on importance score, and an act 306 of periodically identifying and ranking facts.

The data story generation system 106 performs the act 302 of identifying facts that satisfy certain conditions. In particular, the data story generation system 106 applies temporal filter(s) 308 and categorical filter(s) 310 to facts within a dataset. In some embodiments, the data story generation system 106 applies no more than two each of the temporal filter(s) 308 and the categorical filter(s) 310. The temporal filter(s) 308 illustrated in FIG. 3 include a year filter (e.g., Y=2020) and a month filter (e.g., M=Jan). The categorical filter(s) 310 illustrated in FIG. 3 include filters constraining measure (e.g., measure=sales) and breakdown (e.g., breakdown=Paid user). The temporal filter(s) 308 and the categorical filter(s) 310 correspond to fact objects. The data story generation system 106, in one or more embodiments, filters facts based on an object within a fact tuple. For instance, the data story generation system 106 filters facts based on type, subspace, breakdown, measure, and/or focus. In some embodiments, the act 302 optionally comprises automatically proceed to performing the act 304 for all facts within a dataset in place of identifying facts that satisfy certain conditions.

The data story generation system 106 further performs the act 304 of ranking the facts based on importance score. In particular, the data story generation system 106 generates importance scores for the facts that satisfy certain conditions (or all facts within a dataset). The data story generation system 106 further ranks the facts by on importance score. FIG. 4 illustrates, in greater detail, how the data story generation system 106 generates importance scores in accordance with one or more embodiments.

In some embodiments, the data story generation system 106 identifies a threshold number of important facts. For instance, the data story generation system 106 may extract a threshold number of facts having the highest importance scores. In another embodiment, the data story generation system 106 extracts facts corresponding with importance scores meeting a threshold importance value.

The series of acts 300 further includes the act 306 of periodically identifying and ranking facts. In particular, because the series of acts 300 does not take user selections into account, the data story generation system 106 may periodically identify facts that satisfy certain conditions and rank the facts based on importance score. For example, the data story generation system 106 identifies and ranks facts on a daily, weekly, monthly, etc. basis.

While FIG. 3 illustrates extraction of important facts without user input, FIG. 4 illustrates a series of acts 320 for extraction of important facts relevant to a user query. In particular, FIG. 4 illustrates the data story generation system 106 performing an act 312 of receiving a user query indicating target values, an act 314 of identifying qualifying facts, an act 316 of identifying one edit facts, and an act 318 of ranking the facts based on importance score.

As illustrated in FIG. 4, the series of acts 320 includes the act 312 of receiving a user query indicating target values. Target values include one or more values for objects of a fact tuple including subspace, measure, breakdown, etc. For example, and as illustrated in FIG. 4, the user query includes target values for breakdown (e.g., Paid user) and measure (e.g., sales).

The series of acts 320 includes the act 314 of identifying qualifying facts. In particular, the data story generation system 106 identifies facts having the target values indicated by the user query. To illustrate, based on the target values "breakdown=paid user; measure=sales," the data story generation system 106 categories facts having the target paid user breakdown and sales measure as qualifying facts. The data story generation system 106 does not filter based on unspecified values. For example, because the user query did not include a target subspace, a target fact type, or a target aggregation, the data story generation system 106 identifies facts having any value corresponding to the unspecified values. As illustrated in FIG. 4, the data story generation system 106 identifies a qualifying fact 322 defined by a partial tuple including City=New York, Paid user=True, and measure=Sales.

Additionally, and as illustrated in FIG. 4, the data story generation system 106 performs the act 316 of identifying one edit facts. In particular, the data story generation system 106 iteratively incorporates one edit at user-specified target values to the identified qualifying facts. Additionally, or alternatively, the data story generation system 106 incorporates one edit at user unspecified values. To illustrate, the data story generation system 106 incorporates one edit at the subspace object by editing "City=New York" from the qualifying fact 322 to "City=Philadelphia" in one edit fact 324. The qualifying fact 322 and the one edit fact 324 are directly comparable and hence are able to be placed coherently into a visual data story. For example, the data story compares the same phenomena between New York and Philadelphia.

As illustrated in FIG. 4, the acts 314 and 316 are performed after a user query is given. In some embodiments, the data story generation system 106 controls the runtime complexity by restricting the search space around the qualifying facts. In particular, the data story generation system 106 optionally restricts the search space in which qualifying facts and one edit facts are identified.

As further illustrated in FIG. 4, the series of acts 320 includes the act 318 of ranking the facts based on importance score. Like how the data story generation system 106 performs the act 304 illustrated in FIG. 3, the data story generation system 106 generates importance scores for the identified qualifying facts and one edit facts and ranks the facts based on the scores. The data story generation system 106 extracts important facts based on the importance scores.

In one or more embodiments, a fact ($f_i$) is defined as the tuple:

<Type($t_i$), Subspace($s_i$), Measure($m_i$), Breakdown($b_i$), Aggregate($agg_i$)>

For example, the fact "Total profit on company X cars is increasing over years" is represented as <TREND, Company=X, Profit, Year, Total>. The fact comprises objects (type, subspace, measure, etc.) that may correspond with values.

Generally, fact types comprise sets of all possible instances of the same kind of fact. As illustrated, example fact types include value, difference, proportion, trend, categorization, distribution, rank, association, extreme, and outlier. A fact may correspond with a subspace ($s_i$) object. Subspace refers to filters applied that specify a subset of a dataset. Subspace objects specifies values including times, places, or other subsets. Example subspace values include {City=New York} or {Year=2022}. Breakdown ($b_i$) refers to the categorical or temporal column lens under which the subspace is further analyzed. The breakdown indicates different categorical (C) or temporal (T) columns. For example, a breakdown value indicates the different cities in a selected subspace or different user types in a selected subspace.

The measure ($m_i$) object refers to the numerical column of interest. N denotes different numerical columns. For example, a measure value might indicate columns of interest such as sales or revenue. Derived value ($V_d$) comprises values not explicit but derived from a fact.

As mentioned, the data story generation system 106 utilizes various object values of facts within a dataset to generate importance scores. In some embodiments, the data story generation system 106 generates an importance score for a fact based on determining a significance score and determining a self-information score. In one example, the importance $I_s(f_i)$ of a fact is defined as the product of a significance score of the fact and a self-information score of the fact as represented by:

$$I_s(f_i) = S(f_i) \cdot I(f_i)$$

Where $S(f_i)$ is the significance score of fact ($f_i$), and $I(f_i)$ is the self-information score of the fact ($f_i$).

The data story generation system 106 generates significance score $S(f_i) \in [0,1]$ by evaluating how "interesting" a fact is through hypothesis tests. The data story generation system 106 quantifies the "interesting-ness" of a fact using the p-value of a hypothesis tests. More specifically, the data story generation system 106 generates significance scores that are defined separately for each fact type based on hypothesis tests.

There is no viable hypothesis test for value fact types. Therefore, in some embodiments, the data story generation system 106 utilizes a fact's occurrence probability $P(f_i)$ as the significance score. Similarly, there is no viable hypothesis applicable to facts of a difference fact type. Therefore, in some embodiments, the data story generation system 106 instead uses a heuristic that defines the significance score as 1 if the difference is between maximum and minimum values. Otherwise, the data story generation system 106 defines the significance score as 0.

In some embodiments, for facts of the trend fact type, the data story generation system 106 performs hypothesis testing using the following method. The data story generation system 106 assumes that a null hypothesis ($H_0$) is where trend X follows a shape with a slope near zero. In the alternative hypothesis ($H_1$), trend X follows a shape with a slope does not equal zero (e.g., !=0). The data story generation system 106 may perform the hypothesis testing using the following steps. The data story generation system 106 fixes trend X to a line using a regression analysis and computes its slope and goodness-of-fit ($r^2$). The data story generation system 106 performs a Wald hypothesis test with a T-distribution to model the distributions of slopes and obtain a p-value. The data story generation system 106 may generate the significance score by calculating $S(f_i)=(r^2)(1-p-value)$ where goodness-of-fit is used as the weight or confidence. 1-pvalue of this hypothesis test indicates how much the slope deviates from 0.

For facts of the categorization fact type, the data story generation system 106 evaluates the degree to which any fact is skewed. More specifically, facts where having the same counts within different categories convey little important information. Thus, skewness gives more valuable information. For categorization fact type facts, the null hypothesis ($H_0$) assumes that counts of each category of the same. The alternate hypothesis ($H_1$) assumes that counts of each category are different. The hypothesis test comprises a chi square test for (equal) proportions. To perform the hypothesis testing, the data story generation system 106 performs a chi square test for the hypothesis to obtain the p-value. Using this hypothesis testing, the significance score $S(f_i)=(1-p-value)$, where 1-p-value of this hypothesis test indicates how skewed the counts of categories are.

Generally, for distribution fact type facts, the data story generation system 106 evaluates how well distributions tend to follow power law distribution with Gaussian noises. In particular, the power-law distribution is well noted in several contexts, including business ones. Thus, the data story generation system 106 tests distribution facts for how "Gaussian-ness" or normality of residuals of the distribution. The null hypothesis ($H_0$) assumes that the distribution X is a power-law distribution with Gaussian noises. The alternate hypothesis ($H_1$) assumes that the null hypothesis is not the underlying phenomenon. The hypothesis test comprises a Shapiro Wilk test for normality. In some embodiments, the data story generation system 106 sorts the distribution X in descending order. The data story generation system 106, in one or more embodiments, fits a power law distribution and obtain residuals. The data story generation system 106 performs a Shapiro Wilk test on the residuals to obtain a p-value. Using this hypothesis testing, the significance score $S(f_i)=(1-p-value)$, where 1-p-value of this hypothesis test indicates how surprisingly the residuals deviate from a Gaussian distribution and thus, the phenomenon from power-law distribution.

Similarly, for rank-type facts, the data story generation system 106 considers the power-law distribution. However, the data story generation system 106 only checks the deviations of the top 3 ranked residuals for normality. The null hypothesis ($H_0$) assumes that the top 3 residuals follow a power-law assumption, and the alternate hypothesis ($H_1$) assumes that the top 3 residuals deviate from power-law assumptions. In some embodiments, the data story generation system 106 performs the Shapiro Wilk test for normality of the top 3 residuals. To perform this test, the data story generation system 106 sorts the rank X in descending order. The data story generation system 106 splits X into X_top3 and X_rest, where X_top3 comprise the top 3 values. The data story generation system 106 fits X_rest to a power distribution and utilizes a fitted function to predict values of X_top3. The data story generation system 106 obtains residuals between X_top3 and X_top3_predicted and runs a Shapiro Wilk test on these residuals to obtain the p-value. Using this hypothesis testing, the significance score $S(f_i)=(1-p-value)$, where 1-p-value of this hypothesis test indicates how surprisingly the residuals deviate from a Gaussian distribution and thus, the phenomenon from power-law distribution.

Like distribution- and rank-type facts, extreme-type facts values are assumed to follow a power-law distribution with Gaussian noise. The null hypothesis ($H_0$) assumes that, after fitting fact X to a power law, the distribution of residuals is Gaussian. The alternate hypothesis ($H_1$) is that the null hypothesis is not the underlying phenomenon. The data story generation system 106 conducts a regression analysis for $X\backslash X_{max}$ or exclusion of the maximum value using power-law function $\alpha \cdot i^{-\beta}$, where i comprises an order index and $\beta$ is fixed at 0.7. The data story generation system 106 utilizes a regression model to predict $X_{max}$ to obtain the corresponding residual. The data story generation system 106 further obtains the p-value as the output of a cumulative distribution function of the residual from $X_{max}$. The data story generation system 106 optionally performs the same steps to find the significance for minima extremes. In one or more embodiments, the data story generation system 106 returns the maximum of two significance values and the corresponding focus.

For outlier-type facts, the data story generation system 106 utilizes a null hypothesis ($H_0$) that assumes that no outlier exists in fact X. The alternate hypothesis ($H_1$) posits that at least one outlier exists in fact X. The test comprises one iteration of Grubb's test. Thus, if the null hypothesis is accepted, then the data story generation system 106 sets the significance score to 0. Otherwise, the data story generation system 106 sets the significance score to (1−p-value) where p-value equals the p-value of the Grubb's test.

In some embodiments, the self-information score $I(f_i)$ is defined as the negative logarithm of the probability of occurrence of the fact as represented by $$I(f_i)=-\log_2(P(f_i))$$

where $P(f_i)$ represents the probability of occurrence of the fact. The data story generation system 106 determines the probability of occurrence of the fact by taking the product of occurrence probability of subspace ($P(s_i)$), occurrence probability of breakdown for the given fact type ($P(b_i|t_i)$), occurrence probability of measure for the given fact type ($P(m_i|t_i)$), and occurrence probability of focus for the given subspace ($P(x_i|s_i)$) as represented by $$P(f_i)=P(s_i) \cdot P(b_i|t_i) \cdot P(m_i|t_i) \cdot P(x_i|s_i)$$

Where $$P(s_i) = \frac{1}{2^m} \cdot \prod_{j=1}^{k} P(F_j = V_j).$$

k is the number of filters in the subspace, and m is the total number of columns that can be used for subspace filters. $P(F_j=V_j)$ is the probability that the filter $F_j$ takes the value $V_j$.

Occurrence probability of breakdown for the given fact type ($P(b_i|t_i)$) varies by fact type. For example, $P(b_i|t_i)=1/T$ for 'Trend' fact type, $P(b_i|t_i)=1/C$ for 'Categorization' and 'Distribution' fact types, and $P(b_i|t_i)=1/(C+T)$ for all other fact types. (C is the number of categorical columns and T is the number of temporal columns). $P(m_i|t_i)=1/N$ for all fact types (N is the number of numerical columns). $P(x_i|s_i)=\text{count}(x_i)/\text{count}(s_i)$ where count denotes the cardinality of the set.

FIGS. 3-4 illustrate how data story generation system 106 identifies important facts from a dataset in accordance with one or more embodiments. FIG. 5 illustrates how the data story generation system 106 evaluates the identified important facts using a user query to generate a sequence of facts that dictates a global flow of a visual data story in accordance with one or more embodiments. In particular, FIG. 5 illustrates a series of acts 500 comprising an act 502 of generating a plurality of candidate sequences, an act 504 of generating corresponding candidate scores, and an act 506 of selecting the sequence of facts based on the candidate scores.

As illustrated, the data story generation system 106 performs the act 502 of generating a plurality of candidate sequences. Generally, out of N important facts, the data story generation system 106 identifies N! possible candidate sequences. The data story generation system 106 performs a beam search using the user query as a starting fact. More specifically, the data story generation system 106 fills in unspecified object values to create a starting fact. For example, the user query specifies target values for one or more of subspace, measure, or breakdown, and the data story generation system 106 fills in remaining objects in the fact tuple. As illustrated in FIG. 5, the data story generation system 106 generates candidate sequences 512a-512n. Each of the candidate sequences 512a-512n begin with a starting fact 508 as indicated by the user query. The candidate sequences 512a-512n include the important facts 510a-510c in different orders. For example, in the candidate sequence 512a, the important fact 510b precedes the important fact 510c, while the reverse is true in the candidate sequence 512b.

In some embodiments, the data story generation system 106 generates candidate sequences that utilize all the identified important facts. In other embodiments, the data story generation system 106 utilizes only a subset of identified important facts within the candidate sequences. For example, the data story generation system 106 utilizes important facts having importance scores above a threshold sequence value within the sequence. In other embodiments, the data story generation system 106 utilizes a threshold sequence fact number to limit numbers of facts within the sequence. For example, in one or more embodiments, the data story generation system 106 generates candidate sequences having no more than 3 important facts. In some embodiments, the threshold sequence fact number is received as part of a user query.

Alternatively, in some examples, the data story generation system 106 generates a sequence of facts and determines that the sequence of facts is too long. The data story generation system 106 may determine that an excessive number of facts in the sequence of facts negatively impacts the coherence of a data story by decreasing the number of connecting coherence facts. For example, a user may specify an excessive sequence length. In such cases, the data story generation system 106 utilizes a contraction model to excise facts from a sequence of facts. The data story generation system 106 utilizes the contraction model during the generation of the sequence of facts or during the generation of coherence facts.

As part of performing the beam search, the data story generation system 106 performs the act 504 of generating corresponding candidate scores. As illustrated in FIG. 5, the data story generation system 106 generates candidate scores for the candidate sequences 512a-512n. Scoring the candidate sequences improves the quality of the visual data story. The data story generation system 106 scores the candidate sequences using various parameters including diversity, average coherence, integrity, and relevance. In one example, the scoring used in the beam search is represented by Path Score=α*Diversity+β*Average Coherence+
γ*Integrity+δ*Relevance The following paragraphs describe these parameters in greater detail. While the following paragraphs describe the parameters in relation to a sequence of facts, the parameters may also relate to a data story as a whole. For instance, sequence diversity refers to variance of fact types in a sequence of facts or candidate sequence while story diversity refers to variance of fact types in a data story.

Diversity refers to the variance of fact types in a candidate sequence of facts (and/or the visual data story). Diversity is defined as $$D(S) = \frac{n}{\min(|S|, 10)} \cdot \frac{-\sum_{i=1}^{n} p_i \cdot \ln(p_i)}{\ln(n)}$$

Where n is the total number of fact types used in the candidate sequence S and p, denotes the proportion of i-th fact in the candidate sequence. The first term maximizes the number of fact types used while the second term (normalized entropy) maximizes the evenness of the fact types used in the story.

Coherence refers to the similarity between consecutive facts in a candidate sequence of facts (and/or the visual data story). In some embodiments, the data story generation system 106 defines coherence using a Jaccard similarity index between consecutive facts. The data story generation system 106 converts the facts into sets as {type, breakdown, subspace column, subspace value, measure, aggregate, focus} before calculating the Jaccard similarity. The data story generation system 106 further calculates the average coherence over consecutive facts in the sequence of facts.

The data story generation system 106 optionally uses alternative formulations to the Jaccard similarity index as part of determining coherence of a candidate sequence. For example, the data story generation system 106 is able to determine the edit distance between consecutive fact tuples $f_i$ and $f_{i+1}$. Here, for each object (subspace, breakdown, measure, etc.), the data story generation system 106 determines the number of edits required to convert it to the corresponding value of the second fact. The sum number of edits in each element of the fact tuple is the edit distance.

Integrity refers to the data coverage of a candidate sequence of facts (and/or a data story). Integrity is defined as $$C(S) = \frac{\text{count}\left(\bigcup_{i=0}^{l-1} f_i\right)}{N}$$

Where the numerator denotes the count of all cells covered by the facts in the sequence of facts while N denotes the total number of cells in the dataset or spreadsheet. For instance, N can equal the product of the number of columns and the number of rows. In some embodiments, the data story generation system 106 rescales coverage values so that all parameters are in a comparable range.

Relevance refers to the similarity of facts within a candidate sequence of facts (and/or a data story) to the user query. In some embodiments, the data story generation system 106 determines relevance by first converting the target values of the user query to a list of complete facts that are close to the target values (e.g., a partial fact tuple) given as a user query. The data story generation system 106 utilizes the Jaccard similarity index described previously to compare the list of complete facts with the facts in the candidate sequence of facts to determine relevance of the sequence of facts to the user query.

As shown above, the parameters diversity, average coherence, integrity, and relevance correspond with different weights. To illustrate, weight α corresponds with diversity, weight β corresponds with average coherence, weight γ corresponds with integrity, and weight δ corresponds with relevance. When the weights have higher values (i.e., closer to 1), the data story generation system 106 generates higher scores for candidate sequences having greater corresponding parameters. Setting weights to high values requires additional considerations. For instance, setting weight α for diversity to a high value causes the data story generation system 106 to take more time for expansion. Specifically, the data story generation system 106 will try to utilize more fact types, which in turn leads to increased difficulty in converging on a destination fact. These factors lead to a higher run time. On the other hand, sequences of facts having greater diversity also increases integrity. Specifically, different fact types generally deal with different kinds of columns, which in turn improves integrity.

In some embodiments, the data story generation system 106 determines the weights for the parameters. For example, the data story generation system 106 can determine to set the weight γ for integrity and the weight δ for relevance high (i.e., close to 1). Additionally, or alternatively, the data story generation system 106 receives target weights for at least one of the parameters from a user. For example, a user query may include one or more target weights for parameters. The target weights can define one or more target weights for story parameters and/or sequence parameters.

The data story generation system 106 may further control the width of the beam search. The width of the beam search influences the runtime for generating and selecting facts within a sequence of facts. For example, a larger beam width increases compute time and resources but yields more accurate results. In one example, the data story generation system 106 determines a beam search of width 5 for a size of 100 important facts.

As further illustrated in FIG. 5, the data story generation system 106 performs the act 506 of selecting the sequence of facts based on the candidate scores. In some embodiments, the data story generation system 106 identifies a candidate sequence corresponding with the highest candidate score. To illustrate, the data story generation system 106 designates the candidate sequence 512c having the ordered important facts 510b, 510a, and 510c as the sequence of facts because the candidate sequence 512c has the highest candidate score.

As mentioned, in one or more embodiments, the sequence of facts does not constitute the final data story. While a sequence of facts may have high integrity, it likely has less coherence. The data story generation system 106 fills gaps between consecutive facts in the sequence of facts by generating coherence facts. Coherence facts both ensure coherence in the data story and add more exploration of the entire dataset. FIG. 6 and the corresponding discussion further detail how the data story generation system 106 generates coherence facts in accordance with one or more embodiments. FIG. 6 illustrates a series of acts 600 comprising an act 602 of generating a set of new facts, an act 604 of performing a beam search on the set of new facts, and an act 606 of determining that the one or more coherence facts satisfy a stopping condition.

As illustrated in FIG. 6, the data story generation system 106 performs the act 602 of generating a set of new facts. The data story generation system 106 takes consecutive facts in a sequence of facts and designates one as a source fact and the other as a neighboring fact. The data story generation system 106 generates a set of new facts starting from the source facts. As illustrated in FIG. 6, a sequence of facts 612 comprises facts 610a-610c. The data story generation system 106 designates the fact 610a as a source fact and the fact 610b as the neighboring fact. The data story generation system 106 generates a set of new facts comprising new facts 614a-614n starting from the fact 610a.

The data story generation system 106 generates a set of new facts that are logically relevant to the source fact. The data story generation system 106 utilize up to five types of coherence relations that may be used to generate new facts that are relevant to a source fact. The coherence relations comprise similarity, temporal, contrast, elaboration, and generalization. The following paragraphs describe the five coherence relations in greater detail.

In some embodiments, the data story generation system 106 generates new facts based on similarity. Two facts are said to be similar if they are logically parallel to each other. Generally, a new fact is similar to a source fact when it is in a field relevant to the source fact. In one example, the data story generation system 106 generates a new fact by modifying values for objects (measure, breakdown, etc.) without changing the subspace of a source fact. To illustrate, for a source fact defined by {OUTLIER, Category=SUV, Brand, Sales, SUM}, the data story generation system 106 modifies the measure value (e.g., Sales) to generate the new fact defined by {OUTLIER, Category=SUV, Brand, Mileage, SUM}. Additionally, or alternatively, the data story generation system 106 modifies the breakdown value (e.g., Brand) to generate the new fact defined by {OUTLIER, Category=SUV, Country, Sales, SUM}.

The data story generation system 106, in one or more embodiments, generates new facts based on a temporal coherence relation. A new fact is temporally coherent with a source fact when it relates to a succeeding (or preceding) time of the source fact. The data story generation system 106 generates temporally coherent facts by changing the value of the source fact's temporal subspace. For example, the data story generation system 106 modifies the month and/or the year of the source fact's temporal subspace {OUTLIER, Date=08/2020, Brand, Sales, SUM} to generate the new facts {OUTLIER, Date=09/2020, Brand, Sales, SUM} and {OUTLIER, Date=08/2021, Brand, Sales, SUM}.

The data story generation system 106, in one or more embodiments, generates new facts based on a contrast coherence relation. Contrast indicates contradictions between two facts. In one example, the sales trend of one product increases while the sales trend of another product decreases. Contrast is defined only for trend fact types. To generate coherence facts, the data story generation system 106 modifies a subspace and evaluates the dataset to identify data contradictions in measures.

The data story generation system 106, in one or more embodiments, generates new facts based on an elaboration coherence relation. Elaboration implies that a new fact adds more detail to a source fact. In some embodiments, the data story generation system 106 generates new facts that elaborate on source facts by adding additional subspace filters and/or by shrinking the subspace. To illustrate, for the source fact {OUTLIER; Category=SUV; Brand; Sales; SUM}, the data story generation system 106 adds a filter on subspace 'Model' as shown by {Outlier; Category=SUV, Model=XY; Brand; Sales; SUM}. Additionally, or alternatively, the data story generation system 106 adds a filter on subspace 'Country' as shown by {Outlier; Category=SUV, Country=USA; Brand; Sales; SUM}.

In one or more embodiments, the data story generation system 106 utilizes a generalization coherence relation to create new facts. Through generalization, a new fact is an abstraction of the source fact. This is the opposite of elaboration. The data story generation system 106 generates new facts that generalize by removing constraints. To illustrate, the data story generation system 106 removes a filter on the subspace 'Model' from the source fact {Outlier; Category=SUV, Model=XY; Brand; Sales; SUM} to generate the new fact {Outlier; Category=SUV, Brand; Sales; SUM}.

As further illustrated in FIG. 6, the data story generation system 106 performs the act 604 of performing a beam search on the set of new facts. In particular, the data story generation system 106 selects a coherence fact from a set of facts utilizing the beam search. In some embodiments, the data story generation system 106 scores new facts using new fact scores like the candidate score described above with respect to FIG. 5. For example, a new fact score can comprise parameters diversity, average coherence, integrity, and relevance with corresponding weights. In some embodiments, the weights used to calculate the new fact score are different than the weights used to calculate the candidate score. As illustrated in FIG. 6, the data story generation system 106 designates the new fact 614b from the set of new facts 614a-614n as the coherence fact.

In some embodiments, the data story generation system 106 iteratively generates a set of new facts from the last fact. For example, the data story generation system 106 generates an additional set of new facts from the last-identified coherence fact. In particular, the data story generation system 106 generates an additional set of new facts 616a-616n from the new fact 614b. The data story generation system 106 performs a beam search on the additional set of new facts 616a-616n to identify an additional coherence fact. The data story generation system 106 generates sets of new facts and identifies coherence facts until stopping conditions are met.

As illustrated in FIG. 6, the data story generation system 106 performs the act 606 of determining that the one or more coherence facts satisfy a stopping condition. Generally, the stopping conditions terminate the expansion of a sub-story between a source fact and a neighboring fact. In some embodiments, the data story generation system 106 recognizes two stopping conditions: (1) if the new fact generated is the neighboring fact and (2) if the relevance between the last new fact and the neighboring fact is greater than a threshold value. To illustrate, the data story generation system 106 determines that the new fact 614b is the same as the fact 610b, which is the neighboring fact. Thus, the sub-story beginning with the fact 610a terminates at the fact 610b. In some examples, and as illustrated, the data story generation system 106 does not include coherence facts between consecutive facts in a sequence of facts. In other examples, the data story generation system 106 generates several sets of new facts and identifies one or more coherence facts to connect a source fact and a neighboring fact.

The data story generation system 106 repeats the acts 602-606 for all consecutive facts within the sequence of facts. The visual data story comprises the sequence of facts and the connecting coherence facts. The data story generation system 106 generates data visualizations corresponding to the visual data story facts based on fact types. In particular, the data story generation system 106 accesses a mapping of fact types to data visualizations and captions. Based on the mappings, the data story generation system 106 generates appropriate data visualizations and captions.

In some embodiments, the data story generation system 106 provides a data story graphical user interface for display to a user to receive user queries and present data stories. FIGS. 7A-7C illustrate a series of example data story graphical user interfaces in accordance with one or more embodiments.

FIG. 7A illustrates a data story graphical user interface 704a on a screen 702 of a user client device 700 (e.g., user client device 108). The data story graphical user interface 704a includes a dataset upload element 706, a target value selection element 708, and a target parameter weight element 710.

The dataset upload element 706 illustrated in FIG. 7A includes a dataset dropdown 712 and a dataset upload element 714. The data story generation system 106 receives a user selection of a dataset from a dataset dropdown 712. Additionally, or alternatively, the data story generation system 106 uploads a new dataset based on user interaction with the dataset upload element 714. As illustrated, the data story generation system 106 has received a dataset titled "Car Sales."

The data story graphical user interface 704a also includes the target value selection element 708. The target value selection element 708 comprises dropdown menus including potential target values corresponding to objects. As shown, the target value selection element 708 includes selectable target values for measure, breakdown, and aggregate objects. For example, based on selection of a dropdown menu, the user client device 700 expands the dropdown menu to display selectable potential target values. The data story generation system 106 identifies target values based on user selections of candidate target values.

The data story graphical user interface 704a also includes the target parameter weight element 710. As mentioned previously, the user query may include target weights for parameters. The target parameter weight element 710 includes user interface elements for changing weights corresponding to various parameters. More specifically, the data story generation system 106 can receive user selections of weights for diversity, coherence, integrity, and relevance.

As further illustrated in FIG. 7A, the data story graphical user interface 704a comprises a generate element 716. Based on selection of the generate element 716, the data story generation system 106 generates a visual data story using the selected dataset, selected target values, and selected target weights.

The data story generation system 106 further provides the visual data story for display via the data story graphical user interface. In particular, based on receiving a selection of the generate element 716, the user client device 700 updates the screen 702 to display data story graphical user interface 704b illustrated in FIG. 7B. The data story graphical user interface 704b comprises data visualizations 718. The data visualizations 718 correspond to facts within the data story. As illustrated in FIG. 7B, the data visualizations 718 are also associated with captions summarizing information conveyed by the data visualizations.

In one or more embodiments, the data visualizations 718 comprise selectable elements. Based on receiving indication of a user selection of a data visualization, the user client device 700 updates the screen 702 to display data story graphical user interface 704c illustrated in FIG. 7C. More specifically, the data story graphical user interface 704c includes a focused view of an individual data visualization 720 and a caption 726 corresponding to a fact.

As illustrated, the data story graphical user interface 704c illustrated in FIG. 7C further includes a home element 722 and navigation elements 724. Based on user selection of the home element 722 the user client device 700 updates the screen 702 to display an overview of the data visualizations 718 as illustrated in FIG. 7B. Based on user selection of the navigation elements 724, the user client device 700 updates the data story graphical user interface 704c to display a previous or subsequent data visualization in the visual data story.

Figure 8:
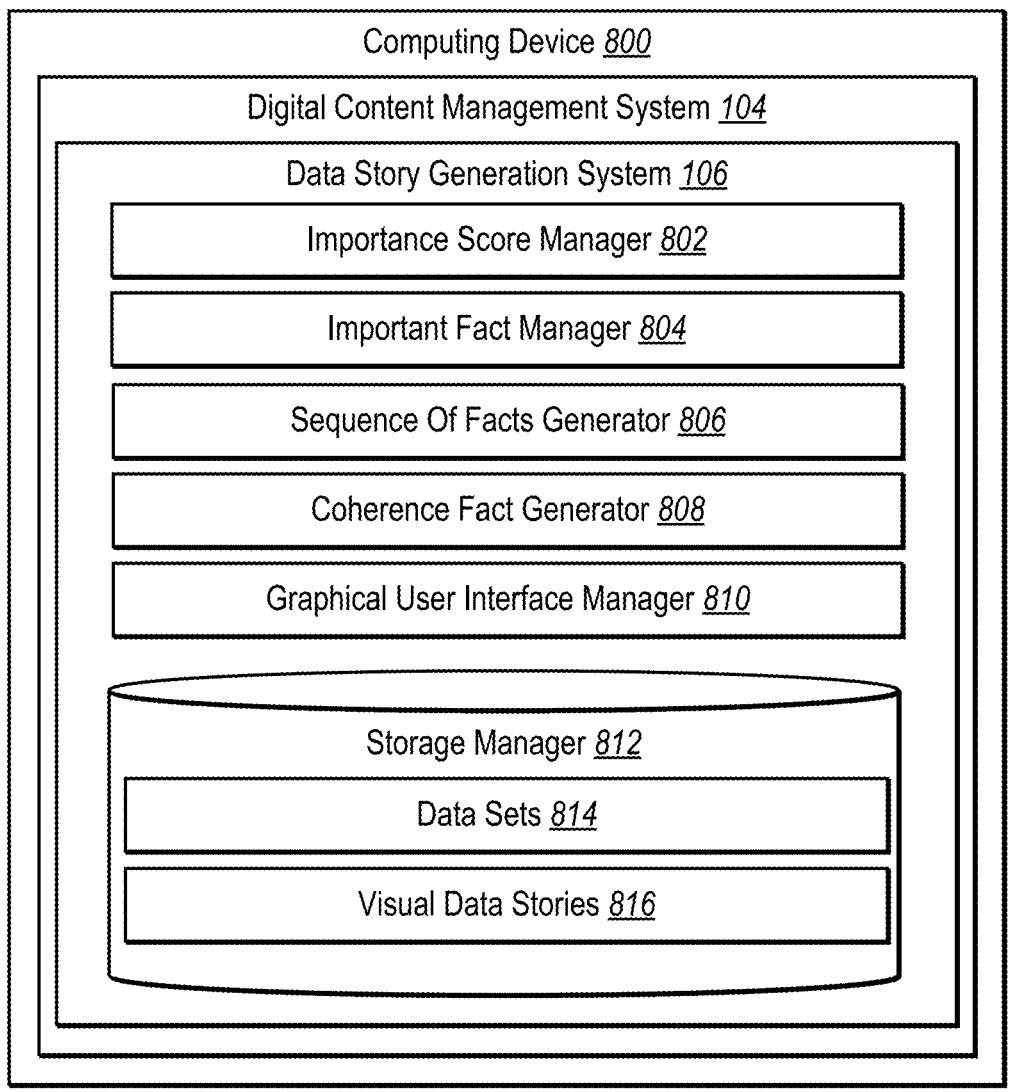
FIG. 8 illustrates a schematic diagram of an example architecture of the data story generation system in accordance with one or more embodiments of the present disclosure.

FIG. 8 provides additional detail regarding various components and capabilities of the data story generation system 106 in accordance with one or more embodiments. Generally, FIG. 8 illustrates the data story generation system 106 implemented by the digital content management system 104 on a computing device 800 (e.g., the user client device 108 and/or the server device(s) 102). As shown, the data story generation system 106 includes, but is not limited to an importance score manager 802, an important fact manager 804, a sequence of facts generator 806, a coherence fact generator 808, a graphical user interface manager 810, and a storage manager 812.

The data story generation system 106 illustrated in FIG. 8 includes the importance score manager 802. The importance score manager 802 scores facts from datasets and manages associations between facts and importance scores. The important fact manager 804 illustrated in FIG. 8 extracts important facts based on the importance scores. The sequence of facts generator 806 generates sequences of facts using the important facts. Additionally, the sequence of facts generator 806 accesses user queries as part of generating the sequences of facts. The data story generation system 106 includes the coherence fact generator 808. In particular, the coherence fact generator 808 generates sets of new facts and selects coherence facts from the sets of new facts to connect consecutive facts within sequences of facts. The graphical user interface manager 810 manages graphical user interfaces including a data story graphical user interface. In particular, the graphical user interface manager 810 can receive user queries and present visual data stories via the data story graphical user interface. The storage manager 812 stores the datasets 814. The datasets 814 comprise datasets uploaded or imported by a user. Furthermore, the 812 stores the visual data stories 816, which comprise visual data stories generated by the data story generation system 106.

In some embodiments, the data story generation system 106 is implemented as part of the digital content management system 104 in a distributed system of the server devices for generating data stories. Additionally, or alternatively, the data story generation system 106 is implemented on a single computing device such as the server device(s) 102 of FIG. 1.

In one or more embodiments, each of the components of the data story generation system 106 are in communication with one another using any suitable communication technologies. Additionally, the components of the data story generation system 106 are in communication with one or more other devices including the user client device 108 illustrated in FIG. 1. Although the components of the data story generation system 106 are shown as separate in FIG. 8, any of the subcomponents may be combined into fewer components, such as into a single component or divided into more components as may serve a particular implementation.

Furthermore, although the components of FIG. 8 are described in connection with the data story generation system 106, at least some components for performing operations in conjunction with the data story generation system 106 described herein may be implemented on other devices within the environment.

The components of the data story generation system 106 can include software, hardware, or both. For example, the components of the data story generation system 106 can include one or more instructions stored on a computer-readable storage medium and executable by processors of one or more computing devices (e.g., the user client device 108). When executed by the one or more processors, the computer-executable instructions of the data story generation system 106 can cause the computing devices to perform the data story generation methods described herein. Alternatively, the components of the data story generation system 106 can comprise hardware, such as a special purpose processing device to perform a certain function or group of functions. Additionally, or alternatively, the components of the data story generation system 106 can include a combination of computer-executable instructions and hardware.

Furthermore, the components of the data story generation system 106 performing the functions described herein with respect to the data story generation system 106 may, for example, be implemented as part of a stand-alone application, as a module of an application, as a plug-in for applications, as a library function or functions that may be called by other applications, and/or as a cloud-computing model. Thus, the components of the data story generation system 106 may be implemented as part of a stand-alone application on a personal computing device or a mobile device. Alternatively, or additionally, the components of the data story generation system 106 may be implemented in any application that provides image management, including, but not limited to ADOBE® CREATIVE CLOUD, such as ADOBE® MAGENTO®, ADOBE® INDESIGN®, ADOBE® ANALYTICS, ADOBE® MARKETING CLOUD™, and ADOBE® ADVERTISING CLOUD. "ADOBE", "ADOBE MAGENTO", "INDESIGN," and "ADOBE MARKETING CLOUD" are registered trademarks of Adobe Inc in the United States and/or other countries.

Figure 9:
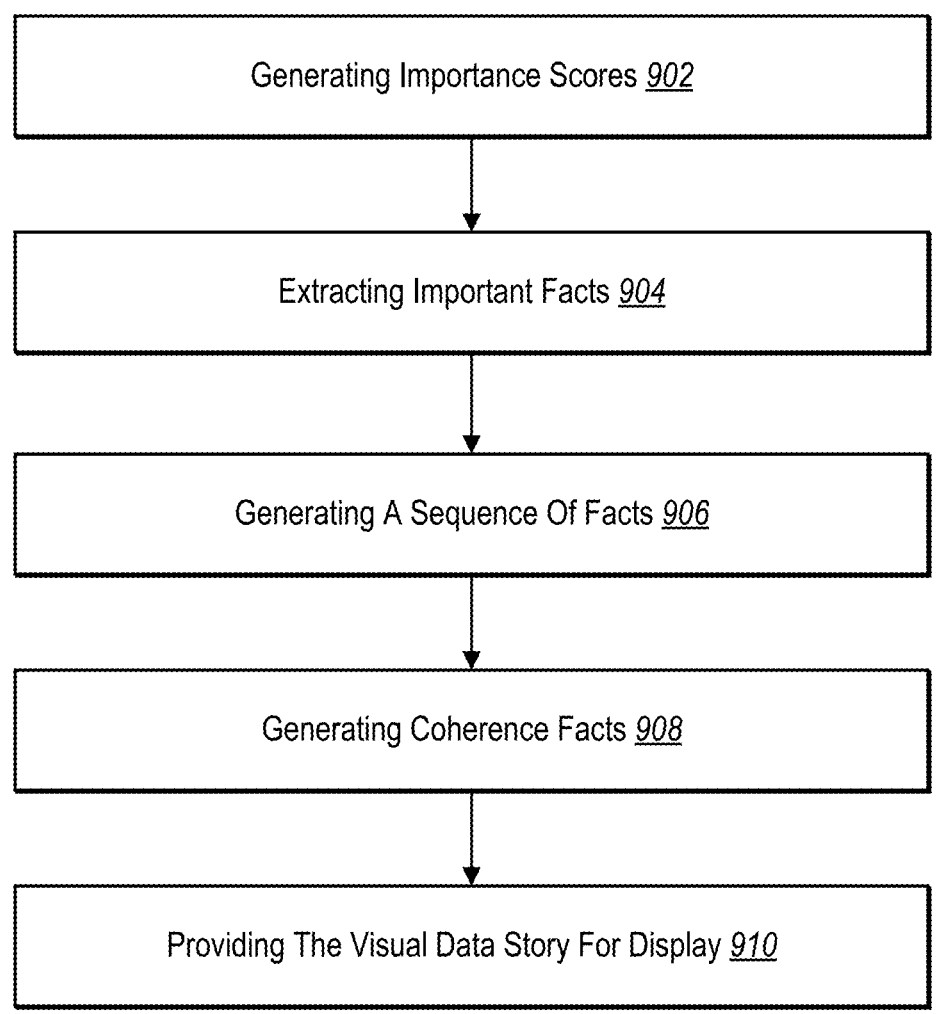
FIG. 9 illustrates a series of acts for generating a visual data story in accordance with one or more embodiments of the present disclosure.

FIGS. 1-8, the corresponding text, and the examples provide a number of different methods, systems, devices, and non-transitory computer-readable media of the data story generation system 106. In addition to the foregoing, one or more embodiments can also be described in terms of flowcharts comprising acts for accomplishing the particular result, as shown in FIG. 9. The series of acts illustrated in FIG. 9 may be performed with more or fewer acts. Further, the illustrated acts may be performed in different orders. Additionally, the acts described herein may be repeated or performed in parallel with one another or in parallel with different instances of the same or similar acts.

FIG. 9 illustrates a flowchart of a series of acts 900 for generating a visual data story in accordance with one or more embodiments. In particular, the series of acts 900 includes an act 902 of generating importance scores. In particular, the act 902 comprises generating importance scores corresponding to one or more facts in a dataset. In some embodiments, the act 902 comprises determining a significance score of a fact from the one or more facts by utilizing hypothesis testing; determining a self-information score based on a probability of occurrence of the fact; and generating an importance score for the fact based on the significance score and the self-information score. In some embodiments, a fact of the one or more facts is defined by values corresponding with objects comprising at least one of a type, subspace, measure, breakdown, or aggregate.

FIG. 9 also includes an act 904 of extracting important facts. In particular, the act 904 comprises extracting important facts from the one or more facts based on the importance scores. In some embodiments, the act 904 comprises extracting important facts from the one or more facts by ranking the facts based on the importance scores. In some embodiments, extracting important facts from the one or more facts based on the importance scores comprises extracting a fact of the one or more facts defined by objects comprising at least one of a type, subspace, measure, breakdown, or aggregate; and the user query comprises one or more target values corresponding to at least one of the objects. In some embodiments, the act 904 comprises extracting the important facts from the one or more facts by selecting facts with corresponding importance scores above a threshold importance value.

The series of acts 900 illustrated in FIG. 9 includes an act 906 of generating a sequence of facts. The act 906 comprises generating, based on a user query, a sequence of facts from the important facts, wherein the sequence of facts dictates a flow of a visual data story. In particular, the act 906 comprises receiving a user query comprising one or more target values corresponding to the one or more facts. Additionally, the act 906 comprises generating a sequence of facts by identifying a subset of important facts that are relevant to the user query, wherein the sequence of facts dictates a flow of a visual data story. In some embodiments, the one or more target values comprise at least one of a target type, a target subspace, a target measure, a target breakdown, or a target aggregate.

Furthermore, in one or more embodiments, the act 906 further comprises generating the sequence of facts by: generating a plurality of candidate sequences of facts and corresponding candidate scores by performing a beam search of the important facts utilizing the one or more target values; and selecting the sequence of facts from the plurality of candidate sequences based on the candidate scores. In some examples, the candidate scores indicate parameters comprising at least one of diversity, average coherence, integrity, or relevance of the candidate sequences of facts. Furthermore, in certain embodiments, the act 906 comprises generating the average coherence of the candidate scores by utilizing a Jaccard similarity index between a fact and a neighboring fact in the sequence of facts. In some examples, the user query further comprises target weights for at least one of the parameters; and selecting the sequence of facts comprises weighting at least one of the parameters based on the user query.

In some embodiments, generating the sequence of facts comprises generating a plurality of candidate sequences of facts and corresponding candidate scores by performing a beam search of the important facts utilizing the user query as a starting fact; and selecting the sequence of facts from the plurality of candidate sequences based on the candidate scores. Furthermore, in one or more embodiments, generating corresponding candidate scores comprises generating candidate scores that indicate parameters comprising at least one of diversity, average coherence, integrity, or relevance of the candidate sequences of facts. In some embodiments, the operations further comprise generating the average coherence of the candidate scores by utilizing a Jaccard similarity index between a fact and a neighboring fact in the sequence of facts. Additionally, in some embodiments, the user query further comprises target weights for at least one of the parameters; and selecting the sequence of facts comprises weighting at least one of the parameters based on the user query.

The series of acts 900 includes an act 908 of generating coherence facts. The act 908 comprises generating coherence facts to connect facts in the sequence of facts. In some embodiments, generating the coherence facts to connect the facts in the sequence of facts comprises generating a set of new facts that are relevant to a source fact of the sequence of facts; performing a beam search on the set of new facts to identify one or more coherence facts; and determining that the one or more coherence facts satisfy a stopping condition. Furthermore, in one or more embodiments, determining that the one or more coherence facts satisfy the stopping condition comprises at least one of determining that the coherence fact is the same as a neighboring fact to the source fact; or determining that a relevance score between the coherence fact and the neighboring fact exceeds a threshold relevance value. In some embodiments, the act 908 further comprises generating a plurality of coherence facts to connect a source fact and a neighboring fact in the sequence of facts.

FIG. 9 further illustrates an act 910 of providing the visual data story for display. The act 910 comprises providing, for display via a data story graphical user interface, the visual data story comprising the sequence of facts and the coherence facts. In addition (or in the alternative to) the acts described above, in some embodiments, the series of acts 900 includes a step for generating a visual data story. For example, the acts described in reference to FIGS. 5-6 can comprise the corresponding acts (or structure) for performing a step for generating a visual data story.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
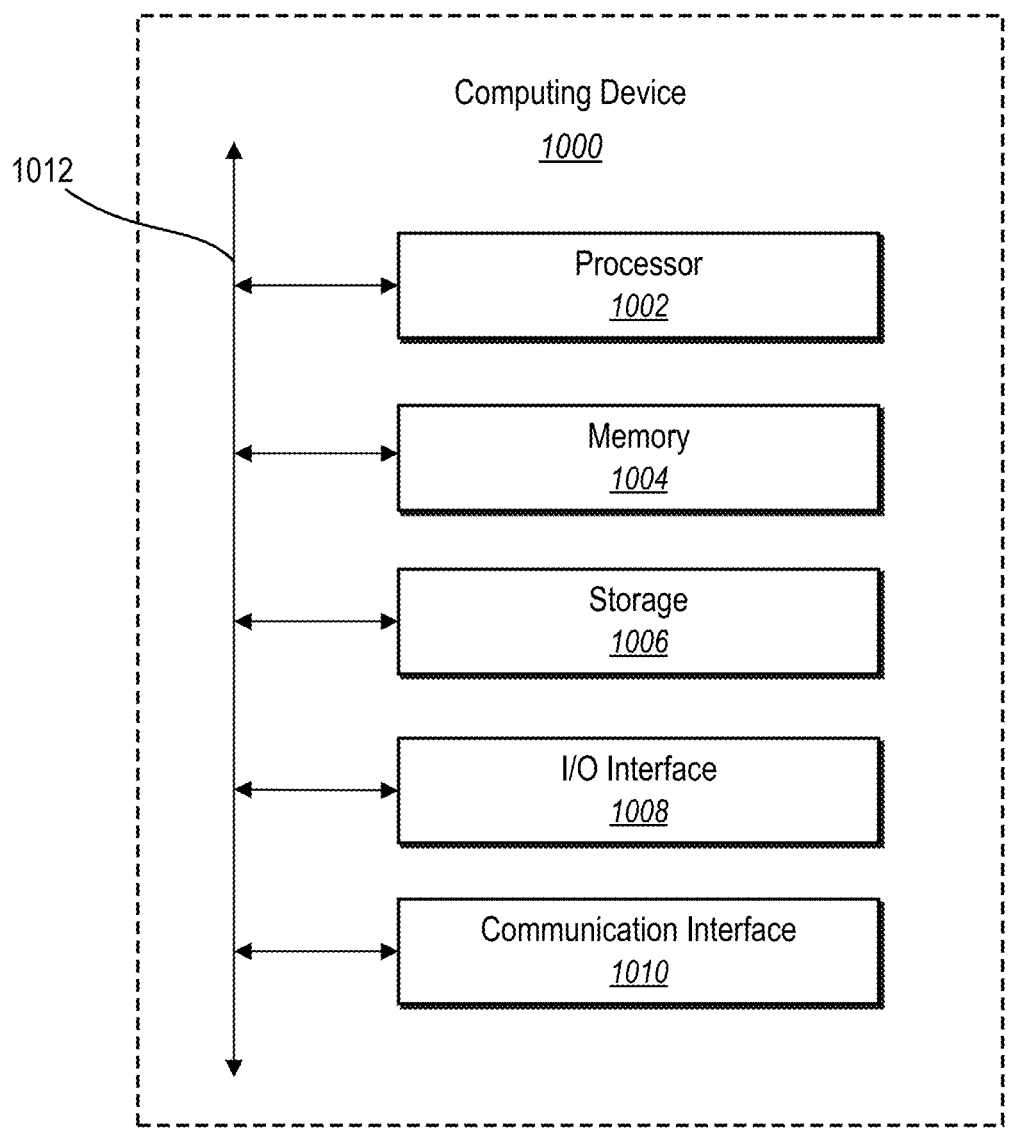
FIG. 10 illustrates a block diagram of an example computing device in accordance with one or more embodiments of the present disclosure.

FIG. 10 illustrates a block diagram of a computing device 1000 that may be configured to perform one or more of the processes described above. One will appreciate that one or more computing devices such as the computing device 1000 may implement the data story generation system 106 and the digital content management system 104. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The invention claimed is:

1. A non-transitory computer readable medium operable to generate a data narrative by storing instructions thereon that, when executed by at least one processor, cause a computing device to perform operations comprising:
generating importance scores corresponding to one or more facts in a dataset, the one or more facts comprising tuples of objects;
extracting important facts from the one or more facts based on the importance scores;
generating, based on a user query specifying target values defined as a partial tuple comprising a subset of the objects, a sequence of facts from the important facts by performing a beam search over a plurality of candidate sequences of facts by:
  determining a variance of fact types in a candidate sequence of facts;
  determining a coherence between facts in the candidate sequence of facts utilizing a similarity index; and
  determining a relevance of the candidate sequence of facts to the user query utilizing the similarity index by filling in the subset of the objects of the partial tuple with remaining objects to generate a list of complete facts and comparing the list of complete facts to the candidate sequence of facts, wherein the sequence of facts dictates a flow of a visual data story;
generating a plurality of coherence facts to connect facts in the sequence of facts;
generating a plurality of data visualizations and captions from the important facts and the plurality of coherence facts; and
providing, for display via a data story graphical user interface, the visual data story comprising the plurality of data visualizations and the captions.

2. The non-transitory computer readable medium recited in claim 1, wherein generating the importance scores comprises:
  determining a significance score of a fact from the one or more facts by utilizing hypothesis testing;
  determining a self-information score based on a probability of occurrence of the fact; and
  generating an importance score for the fact based on the significance score and the self-information score.

3. The non-transitory computer readable medium recited in claim 1, wherein:
  extracting important facts from the one or more facts based on the importance scores comprises extracting a fact of the one or more facts defined by a tuple of the objects comprising at least one of a type, subspace, measure, breakdown, or aggregate; and
  the user query comprises one or more target values corresponding to at least one of the objects.

4. The non-transitory computer readable medium recited in claim 1, wherein generating the sequence of facts comprises:
  generating a plurality of candidate sequences of facts and corresponding candidate scores by performing a beam search of the important facts utilizing the user query as a starting fact; and
  selecting the sequence of facts from the plurality of candidate sequences based on the corresponding candidate scores.

5. The non-transitory computer readable medium recited in claim 4, wherein generating corresponding candidate scores comprises generating candidate scores that indicate parameters comprising at least one of diversity, average coherence, integrity, or relevance of the candidate sequences of facts.

6. The non-transitory computer readable medium recited in claim 5, wherein the operations further comprise generating the average coherence of the candidate scores by utilizing a Jaccard similarity index between a fact and a neighboring fact in the sequence of facts.

7. The non-transitory computer readable medium recited in claim 5, wherein:
  the user query further comprises target weights for at least one of the parameters; and
  selecting the sequence of facts comprises weighting at least one of the parameters based on the user query.

8. The non-transitory computer readable medium recited in claim 1, wherein generating the plurality of coherence facts to connect the facts in the sequence of facts comprises:
  generating a set of new facts that are relevant to a source fact of the sequence of facts;
  performing a beam search on the set of new facts to identify one or more coherence facts; and
  determining that the one or more coherence facts satisfy a stopping condition.

9. The non-transitory computer readable medium recited in claim 8, wherein determining that the one or more coherence facts satisfy the stopping condition comprises at least one of:
  determining that a coherence fact is the same as a neighboring fact to the source fact; or
  determining that a relevance score between the coherence fact and the neighboring fact exceeds a threshold relevance value.

10. The non-transitory computer readable medium recited in claim 1, wherein generating coherence facts to connect facts in the sequence of facts comprises generating a plurality of coherence facts to connect a source fact and a neighboring fact in the sequence of facts.

11. A system comprising:
  a storage device storing a dataset comprising a plurality of facts; and
  at least one processor configured to cause the system to:
    generate importance scores corresponding to one or more facts in the dataset, the one or more facts comprising tuples of objects;
    extract important facts from the one or more facts by ranking the plurality of facts based on the importance scores;
    receive a user query comprising one or more target values corresponding to the one or more facts, the user query specifying the one or more target values defined as a partial tuple comprising a subset of the objects;
    generate a sequence of facts by identifying a subset of important facts that are relevant to the user query by performing a beam search over a plurality of candidate sequences of facts by:
      determining a variance of fact types in a candidate sequence of facts;
      determining a coherence between facts in the candidate sequence of facts utilizing a similarity index; and
      determining a relevance of the candidate sequence of facts to the user query utilizing the similarity index by filling in the subset of the objects of the partial tuple with remaining objects to generate a list of complete facts and comparing the list of complete facts to the candidate sequence of facts, wherein the sequence of facts dictates a flow of a visual data story;
    generate a plurality of coherence facts to connect facts in the sequence of facts;
    generate a plurality of data visualizations and captions from the important facts and the plurality of coherence facts; and
    provide, for display via a data story graphical user interface, the visual data story comprising the plurality of data visualizations and the captions.

12. The system as recited in claim 11, wherein the one or more target values comprise at least one of a target type, a target subspace, a target measure, a target breakdown, or a target aggregate.

13. The system as recited in claim 11, wherein the at least one processor is further configured to generate the sequence of facts by:
   generating a plurality of candidate sequences of facts and corresponding candidate scores by performing a beam search of the important facts utilizing the one or more target values; and
   selecting the sequence of facts from the plurality of candidate sequences based on the corresponding candidate scores.

14. The system as recited in claim 13, wherein the corresponding candidate scores indicate parameters comprising at least one of diversity, average coherence, integrity, or relevance of the plurality of candidate sequences of facts.

15. The system as recited in claim 14, wherein the at least one processor is further configured to generate the average coherence of the corresponding candidate scores by utilizing a Jaccard similarity index between a fact and a neighboring fact in the sequence of facts.

16. The system as recited in claim 14, wherein:
   the user query further comprises target weights for at least one of the parameters; and
   selecting the sequence of facts comprises weighting at least one of the parameters based on the user query.

17. A method of generating a data story comprising:
   generating importance scores corresponding to one or more facts in a dataset, the one or more facts comprising tuples of objects;
   extracting important facts from the one or more facts based on the importance scores;
   generating, based on a user query specifying target values defined as a partial tuple comprising a subset of the objects, a sequence of facts from the important facts by performing a beam search over a plurality of candidate sequences of facts by:
      determining a variance of fact types in a candidate sequence of facts;
      determining a coherence between facts in the candidate sequence of facts utilizing a similarity index; and
      determining a relevance of the candidate sequence of facts to the user query utilizing the similarity index by filling in the subset of the objects of the partial tuple with remaining objects to generate a list of complete facts and comparing the list of complete facts to the candidate sequence of facts, wherein the sequence of facts dictates a flow of a visual data story;
   generating a plurality of coherence facts to connect facts in the sequence of facts;
   generating a plurality of data visualizations performing a step for generating a visual data story; and
   providing the visual data story comprising the plurality of data visualizations and the captions for display via a data story graphical user interface.

18. The method recited in claim 17, wherein generating the importance scores comprises:
   determining a significance score of a fact from the one or more facts by utilizing hypothesis testing;
   determining a self-information score based on a probability of occurrence of the fact; and
   generating an importance score for the fact based on the significance score and the self-information score.

19. The method recited in claim 17, wherein a fact of the one or more facts is defined by values corresponding with objects comprising at least one of a type, subspace, measure, breakdown, or aggregate.

20. The method recited in claim 17, further comprising extracting the important facts from the one or more facts by selecting facts with corresponding importance scores above a threshold importance value.

\* \* \* \* \*